(12) United States Patent
Tilleman et al.

(10) Patent No.: US 8,905,547 B2
(45) Date of Patent: Dec. 9, 2014

(54) SYSTEM AND METHOD FOR EFFICIENTLY DELIVERING RAYS FROM A LIGHT SOURCE TO CREATE AN IMAGE

(75) Inventors: Michael M. Tilleman, Brookline, MA (US); Richard S. Wolfe, Londonderry, NH (US)

(73) Assignee: Elbit Systems of America, LLC, Fort Worth, TX (US)

( * ) Notice: Subject to any disclaimer, the term of this patent is extended or adjusted under 35 U.S.C. 154(b) by 669 days.

(21) Appl. No.: 12/981,137

(22) Filed: Dec. 29, 2010

(65) Prior Publication Data

US 2011/0164221 A1 Jul. 7, 2011

Related U.S. Application Data

(60) Provisional application No. 61/292,110, filed on Jan. 4, 2010.

(51) Int. Cl.
*G03B 21/14* (2006.01)
*G02B 27/28* (2006.01)
*H04N 9/31* (2006.01)

(52) U.S. Cl.
CPC ............ *G02B 27/283* (2013.01); *H04N 9/3167* (2013.01)
USPC .......................................................... 353/20

(58) Field of Classification Search
CPC .............................. G03B 27/28; G03B 27/286
USPC ............. 353/20, 81, 94; 359/485.06, 489.09, 359/489.11, 630, 618, 619, 629, 634; 362/19, 551
See application file for complete search history.

(56) References Cited

U.S. PATENT DOCUMENTS

| 5,184,248 A | 2/1993 | de Vaan et al. ................ 359/483 |
| 5,805,119 A | 9/1998 | Erskine et al. .................... 345/7 |
| 5,978,128 A | 11/1999 | Yoon ............................. 359/298 |

(Continued)

FOREIGN PATENT DOCUMENTS

| DE | 102004003282 A1 * | 8/2005 | |
| EP | 0 927 903 B1 | 10/2002 | ............. G02V 26/08 |
| WO | WO 2005071463 A1 * | 8/2005 | |

OTHER PUBLICATIONS

Notification of Transmittal of the International Search Report and the Written Opinion of the International Searching Authority, or the Declaration; International Application No. PCT/US2010/062533; International Filing Date: Dec. 30, 2010, Date of mailing Jul. 4, 2011.

(Continued)

*Primary Examiner* — Thanh Luu
*Assistant Examiner* — Danell L Owens
(74) *Attorney, Agent, or Firm* — Conley Rose, P.C.

(57) ABSTRACT

In accordance with one embodiment of the present disclosure, a system may include a polarizing beamsplitter for splitting one or more unpolarized rays received from an illumination source into a first polarized component and a second polarized component, the first polarized component and the second polarized component having orthogonal polarizations to each other. The system may also include a half-wave plate for rotating the second polarized component to the same polarization as the first polarized component. The system may further include a lens group for passing the first polarized component to a target plane as a first polarized ray, and further for separately passing the second polarized component to the target plane as a second polarized ray.

32 Claims, 10 Drawing Sheets

(56) References Cited

U.S. PATENT DOCUMENTS

| | | | |
|---|---|---|---|
| 5,995,284 A * | 11/1999 | Vanderwerf | 359/485.06 |
| 6,053,615 A * | 4/2000 | Peterson et al. | 353/20 |
| 6,384,982 B1 * | 5/2002 | Spitzer | 359/630 |
| 6,594,090 B2 | 7/2003 | Kruschwitz et al. | 359/707 |
| 6,874,894 B2 | 4/2005 | Kitamura | 353/97 |
| 6,955,436 B2 | 10/2005 | Watanabe | 353/122 |
| 7,271,960 B2 | 9/2007 | Stewart et al. | 359/630 |
| 7,377,652 B2 | 5/2008 | Whitehead et al. | 353/30 |
| 7,405,856 B2 | 7/2008 | Doherty et al. | 359/245 |
| 7,413,309 B2 | 8/2008 | Whitehead et al. | 353/30 |
| 2002/0135874 A1 * | 9/2002 | Li | 359/497 |
| 2004/0125246 A1 | 7/2004 | Okamori et al. | 349/5 |
| 2004/0218281 A1 * | 11/2004 | Hirata et al. | 359/634 |
| 2005/0170572 A1 * | 8/2005 | Hongo et al. | 438/166 |
| 2005/0190345 A1 | 9/2005 | Dubin et al. | 353/85 |
| 2006/0119802 A1 * | 6/2006 | Akiyama | 353/94 |
| 2006/0164726 A1 * | 7/2006 | Morejon et al. | 359/495 |
| 2007/0019163 A1 * | 1/2007 | Ikeda et al. | 353/20 |
| 2007/0146638 A1 * | 6/2007 | Ma et al. | 353/20 |
| 2008/0218438 A1 | 9/2008 | Aral et al. | 345/55 |
| 2009/0128901 A1 | 5/2009 | Tilleman et al. | 359/475 |

OTHER PUBLICATIONS

Michael M. Tilleman et al., *System and Method for Adjusting a Projected Image*, U.S. Appl. No. 12/974,578, filed Dec. 21, 2010, (34 pgs.).

Michael M. Tilleman et al., *System for Adjusting a Projected Image*, U.S. Appl. No. 61/290,827, filed Jan. 29, 2009, (21 pgs.), Dec. 29, 2009.

PCT re: Invitation to Pay Additional Fees and, Where Applicable, Protest Fee; PCT Article 17(3)(a) and Rule 40.1 and 40.2(e)); International Appl. No. PCT/US 2010/062533; International Filing Date Dec. 30, 2010; mailed Apr. 28, 2011.

\* cited by examiner

SYSTEM AND METHOD FOR EFFICIENTLY DELIVERING RAYS FROM A LIGHT SOURCE TO CREATE AN IMAGE

RELATED APPLICATION

This application claims the benefit under 35 U.S.C. §119(e) of the priority of U.S. Provisional Application No. 61/292,110 filed Jan. 4, 2010, entitled "System for Efficiently Delivering Rays From a Light Source to Create an Image."

TECHNICAL FIELD

This disclosure relates in general to illumination systems and more particularly to a system and method for efficiently delivering rays from a light source to create an image.

BACKGROUND

Typically, illumination systems, such as an image projector, are used for the projection of synthetic images on various objects. Such illumination systems, however, are deficient because their techniques for delivering rays from a light source to create an image are inefficient.

SUMMARY OF THE DISCLOSURE

In accordance with one embodiment of the present disclosure, a system may include a polarizing beamsplitter for splitting one or more unpolarized rays received from an illumination source into a first polarized component and a second polarized component, the first polarized component and the second polarized component having orthogonal polarizations to each other. The system may also include a half-wave plate for rotating the second polarized component to the same polarization as the first polarized component. The system may further include a lens group for passing the first polarized component to a target plane as a first polarized ray, and further for separately passing the second polarized component to the target plane as a second polarized ray.

In accordance with one embodiment of the present disclosure, a system may include a polarizing beamsplitter for combining a first polarized ray received from a first illumination system with a second polarized ray received from a second illumination system to form a combined polarized ray. The system may also include a second polarizing beamsplitter for splitting the combined polarized ray into a first polarized component and a second polarized component, the first polarized component and the second polarized component having orthogonal polarizations to each other. The system may further include a half-wave plate for rotating the second polarized component to the same polarization as the first polarized component. The system may further include a lens group for passing the first polarized component to a single image generator as a first polarized imaging ray, and further for separately passing the second polarized component to the single image generator as a second polarized imaging ray.

Numerous technical advantages are provided according to various embodiments of the present disclosure. Particular embodiments of the disclosure may exhibit none, some, or all of the following advantages depending on the implementation. In certain embodiments, an illumination system may separately deliver two polarized rays to a target plane, resulting in a more efficient delivery of the rays emitted from the illumination source. In certain embodiments, an illumination system may convert the radiant distribution of an illumination source, resulting in an illumination distribution that is nearly uniform. As such, the radiance spatial distribution of an image may be controllable, and further may be nearly uniform or homogeneous, resulting in a well balanced image.

In certain embodiments, an illumination system may tailor the contour of the rays delivered to a target plane, thereby allowing the image produced by the illumination system to match the pattern of the target plane. As such, the efficiency of the illumination system may be increased by preventing optical power from being used to create an image with a cross section that does not fit on the target plane, is too big for the target plane, or is improperly shaped for the target plane. In certain embodiments, an illumination system may combine rays emitted from two unpolarized illumination sources so as to propagate to a single image generator, thereby creating an image on a target plane using both illumination sources. As such, the illumination system only includes a single image generator, as opposed to an image generator for each illumination source.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1 through 9 of the drawings, like numerals being used for like and corresponding parts of the various drawings.

Figure 1:
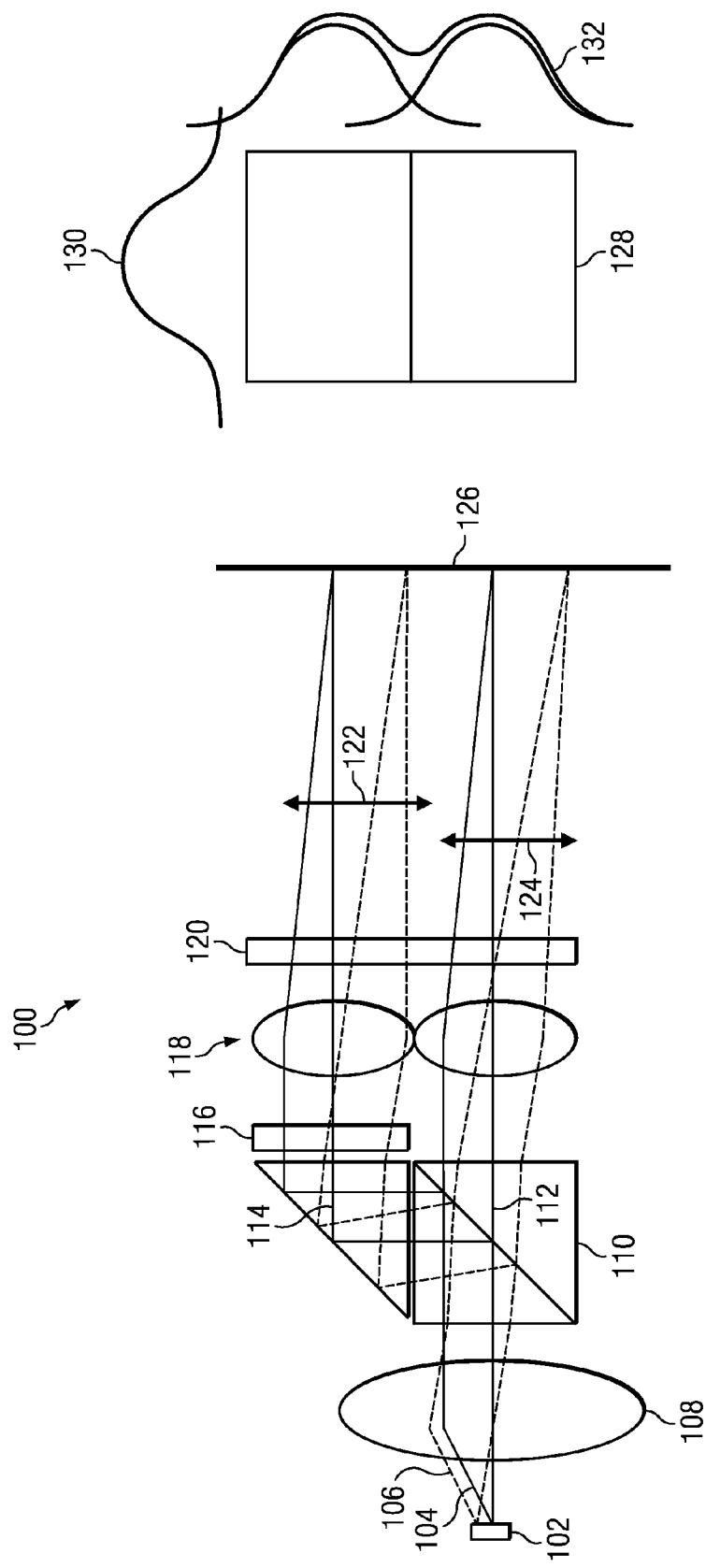
FIG. 1 is a diagram illustrating a side view of one embodiment of an illumination system for efficiently delivering rays from a light source to create an image.

FIG. 1 is a diagram illustrating a side view of one embodiment of an illumination system 100 for efficiently delivering rays from a light source to create an image. In one embodiment, illumination system 100 includes a polarizing beamsplitter 110 that may split a ray emitted from an illumination source 102 into two polarized rays and propagate the two polarized rays towards a target plane 126. As such, both polarized rays are separately delivered to target plane 126, resulting in a more efficient and homogenized delivery of the rays emitted from the illumination source 102 than without such polarization and such separate delivery of the polarized rays.

According to the illustrated embodiment, illumination system 100 includes the illumination source 102, a collimating lens 108, the polarizing beamsplitter 110, a half-wave-plate 116, an imaging lens pair 118, a lens group 120, and a target plane 126. In one embodiment, the illumination source 102 may include any device that emits electromagnetic radiation. In a further embodiment, the illumination source 102 may emit electromagnetic radiation with nonuniform, arbitrary irradiant spatial distribution. For example, the illumination source 102 may include a light emitting diode (LED), such as a high luminance LED. As other examples, the illumination source 102 may include an incandescent lamp, an electric discharge lamp, or a laser. In a further embodiment, the illumination source 102 may emit unpolarized electromagnetic radiation.

According to the illustrated embodiment, the electromagnetic radiation emitted from the illumination source 102 may be referred to as marginal rays 104 and 106. Furthermore, although the illustrated embodiment includes two rays 104 and 106, the illumination source 102 may emit more than two rays, or less than two rays. In one embodiment, the rays 104 and 106 may originate at the source center and periphery of the illumination source 102. In a further embodiment, after the rays 104 and 106 are emitted from the illumination source 102, the rays 104 and 106 may propagate towards the collimating lens 108.

Collimating lens 108 may include any device that receives the rays 104 and 106 and collimates the rays 104 and 106. In one embodiment, the collimating lens 108 may include a lens having any suitable shape, size, and/or composition. In a further embodiment, the collimating lens 108 may include more than one lens singlet. In one embodiment, after the collimating lens 108 collimates the rays 104 and 106, the rays 104 and 106 may propagate to the polarizing beamsplitter 110.

Polarizing beamsplitter 110 may include any device that splits the rays 104 and 106 into polarized components. For example, the polarizing beamsplitter 110 may include a prism. In one embodiment, the polarizing beamsplitter may split the rays 104 and 106 into p-polarized components 112 and s-polarized components 114. According to the illustrated embodiment, the p-polarized components 112 may refer to the p-polarized component of ray 104 and the p-polarized component of ray 106, and the s-polarized components 114 may refer to the s-polarized component of ray 104 and the s-polarized component of ray 106. In one embodiment, the polarizing beamsplitter 110 may polarize each of the unpolarized rays 104 and 106 by splitting them into the p-polarized components 112 and the s-polarized components 114. In a further embodiment, once the rays 104 and 106 are split into the p-polarized components 112 and the s-polarized components 114, the p-polarized components 112 may propagate directly to the imaging lens pair 118, and the s-polarized components 114 may propagate to the half-wave-plate 116 before propagating to the imaging lens pair 118.

Half-wave-plate 116 may include any device that rotates the s-polarized components 114 to a p-polarized electromagnetic field. In one embodiment, the half-wave-plate 116 rotates the polarization of the s-polarized components 114 by 90 degrees when the fast-axis of the half-wave-plate 116 is rotated at 45 degrees. In one embodiment, the rotated fast axis may rotate the s-polarized components 114 to the p-polarized electromagnetic field. In a further embodiment, by rotating the s-polarized components 114 to the p-polarized electromagnetic field, the s-polarized components 114 are rotated into p-polarized components 114. In one embodiment, the rotation of the s-polarized components 114 into the p-polarized components 114 may be referred to as likewise polarization (e.g., both the p-polarized components 112 and the p-polarized components 114 now have the same polarization). According to one embodiment, once the s-polarized components 114 are rotated into the p-polarized components 114, the p-polarized components 114 may propagate to the imaging lens pair 118.

Imaging lens pair 118 may include any lens that receives the p-polarized components 112 from the polarizing beamsplitter 110 and the p-polarized components 114 from the half-wave-plate 116. In one embodiment, the imaging lens pair 118 may include a pair of lenses, or a single lens. In a further embodiment, the imaging lens pair 118 may include multiple lenses arranged as a lens group. In another embodiment, the imaging lens pair 118 may include any combination of lenses, singlet lens elements, prisms, and/or diffractive elements. In one embodiment, after receiving the p-polarized components 112 and 114, the imaging lens pair 118 may pass the p-polarized components 112 and 114 to the lens group 120. According to additional embodiments, the imaging lens pair 118 may refract the p-polarized components 112 and 114, diffract the p-polarized components 112 and 114, or adjust the p-polarized components 112 and 114 in any way.

Lens group 120 may include any lens that receives the p-polarized components 112 and 114 from the imaging lens pair 118. In one embodiment, lens group 120 may include a single lens. In a further embodiment, the lens group 120 may include multiple lenses arranged as the lens group. In another embodiment, the lens group 120 may include any combination of lenses, singlet lens elements, prisms, and/or diffractive elements. According to additional embodiments, the lens group 120 may refract the p-polarized components 112 and 114, diffract the p-polarized components 112 and 114, or adjust the p-polarized components 112 and 114 in any way. For example, in certain embodiments, the lens group 120 may tailor the contour of the p-polarized components 112 and 114 so that image 128 produced by the illumination system 100 may be any suitable shape, such as a square, rectangle, circle, ellipse, or any other suitable shape. In certain embodiments, the tailoring of the contour of the p-polarized components 112 and 114 may allow the image 128 produced by the illumination system 100 to match the pattern of the target plane 126. For example, in certain embodiments where the target plane 126 has a circular shape, the tailoring of the contour of the p-polarized components 112 and 114 may allow the image 128 produced to be circular, so that it matches the target plane 126. In one embodiment, this may increase the efficiency of the illumination system 100 by preventing optical power from being used to create an image 128 with a cross section that does not fit on the target plane 126, is too big for the target plane 126, or is improperly shaped for the target plane 126. In certain embodiments, the lens group 120 may have any suitable shape or size suitable for tailoring the contour of the p-polarized components 112 and 114. For example, the lens group 120 may be cylindrical, spherical or toroidal, and possess a circular, rectangular, or any other suitable shape. Furthermore, the lens group 120 may include any combination of lenses, singlet lens elements, prisms, and/or diffractive elements suitable for tailoring the contour of the p-polarized components 112 and 114.

In one embodiment, after receiving the p-polarized components 112 and 114, the lens group 120 may pass the p-polarized components 112 and 114 to the target plane 126. According to the illustrated embodiment, the p-polarized components 112 and 114 that pass through the lens group 120 are referred to as polarized rays 122 and 124.

Although the illustrated embodiment illustrates the imaging lens pair 118 and the lens group 120 as separate lenses, in one embodiment, the imaging lens pair 118 and the lens group 120 may be a part of the same lens group, or may even be the same lens. In such an embodiment, the lens group (or single lens) may pass the p-polarized components 112 and 114 to the target plane 126 as the polarized rays 122 and 124.

Target plane 126 may include any device that allows the polarized rays 122 and 124 to be viewed as an image 128. In one embodiment, the target plane 126 may include a collecting aperture for any incident beams, a diffusing screen, a blank wall, a user's eye, an optical diffuser, a mirror, a spatial modulator, an image generator, and/or any other suitable device for receiving the polarized rays 122 and 124 from the lens group 120. In one embodiment, the image 128 may be an image of the illumination source 102.

According to the illustrated embodiment, the image 128 may be produced using the maximum amount of the illuminating electromagnetic radiation emanating from the illumination source 102. For example, in one embodiment, each of the polarized rays 122 and 124 provides a radiance spatial distribution that replicates the radiant distribution of the illumination source 102 in both a corresponding plane, as can be seen by profile 130, and also in an orthogonal plane, as can be seen by profile 132. In one embodiment, by providing each of the polarized rays 122 and 124 to the target plane 126 (as opposed to combining the polarized rays 122 and 124 into a single ray which is then provided to the target plane 126), the polarized rays 122 and 124 may create the image 128 with two separate radiance spatial distributions in the orthogonal plane, as can be seen by profile 132. Therefore, according to the illustrated embodiment, the two separate radiance spatial distributions may be combined to form a single more uniform radiance spatial distribution in the orthogonal plane, as can be further seen by profile 132. In one embodiment, this single more uniform radiance spatial distribution may result in the image 128 being produced using more of the electromagnetic radiation emitted from the illumination source 102. In a further embodiment, it may result in the image 128 being produced using the maximum amount of the electromagnetic radiation. As such, in one embodiment, the rays 104 and 106 emitted from the illumination source 102 may be more efficiently used to create the image 128.

Modifications, additions, or omissions may be made to the illumination system 100 without departing from the scope of the invention. For example, illumination system 100 may be modified so that the p-polarized components 112 are rotated to s-polarized components 112 instead of the s-polarized components 114 being rotated to p-polarized components 114. The components of the illumination system 100 may be integrated or separated. Moreover, the operations of the illumination system 100 may be performed by more, fewer, or other components. For example, the operations of the polarizing beamsplitter 110 may be performed by more than one component. As used in this document, "each" refers to each member of a set or each member of a subset of a set.

Figure 2:
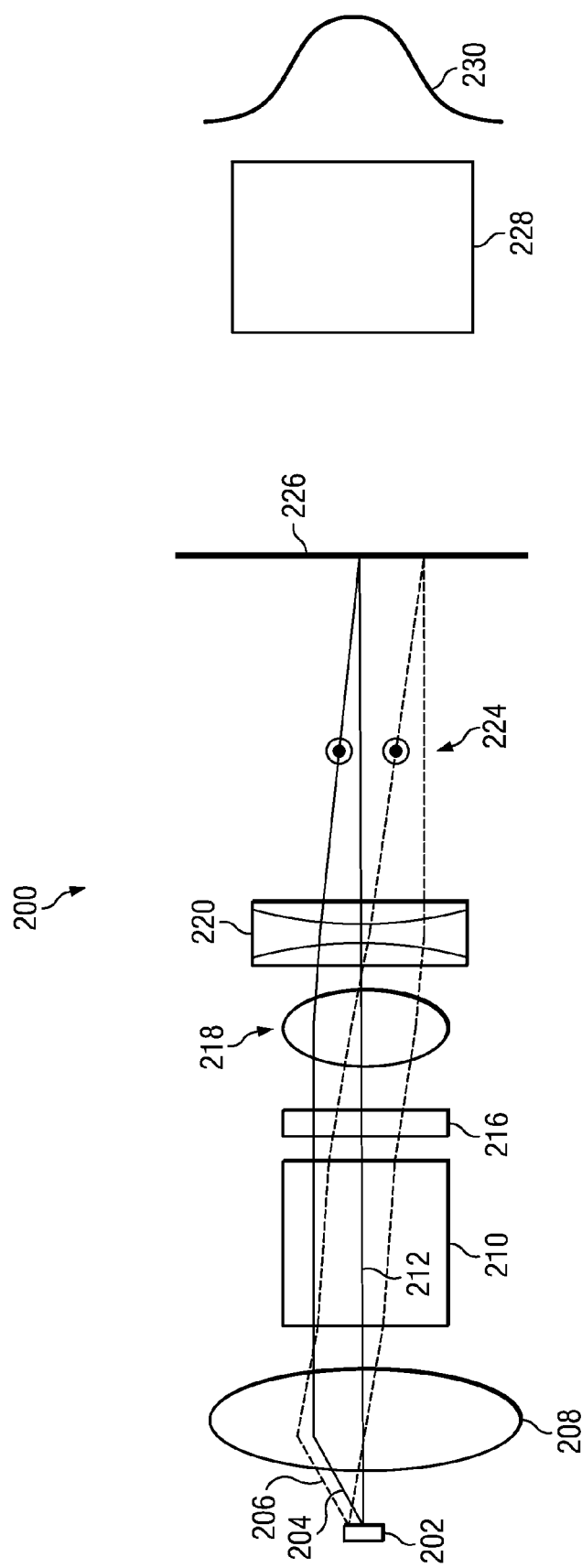
FIG. 2 is a diagram illustrating a top view of one embodiment of an illumination system for efficiently delivering rays from a light source to create an image.

FIG. 2 is a diagram illustrating a top view of one embodiment of an illumination system 200 for efficiently delivering rays from a light source to create an image. In one embodiment, illumination system 200 includes a polarizing beamsplitter 210 that may split a ray emitted from an illumination source 202 into two polarized rays and propagate the two polarized rays towards a target plane 226. As such, both polarized rays are separately delivered to the target plane 226, resulting in a more efficient delivery of the rays emitted from the illumination source 102.

According to the illustrated embodiment, the illumination system 200 includes the illumination source 202, rays 204 and 206, a collimating lens 208, the polarizing beamsplitter 210, p-polarized components 212, a half-wave-plate 216, an imaging lens pair 218, a lens group 220, polarized rays 224, and a target plane 226. In one embodiment, the illumination source 202 of FIG. 2 is similar to the illumination source 102 of FIG. 1, the rays 204 and 206 of FIG. 2 are similar to the rays 104 and 106 of FIG. 1, the collimating lens 208 of FIG. 2 is similar to the collimating lens 108 of FIG. 1, the polarizing beamsplitter 210 of FIG. 2 is similar to the polarizing beamsplitter 110 of FIG. 1, the p-polarized components 212 of FIG. 2 are similar to the p-polarized components 112 of FIG. 1, the half-wave-plate 216 of FIG. 2 is similar to the half-wave-plate 116 of FIG. 1, the imaging lens pair 218 of FIG. 2 is similar to the imaging lens pair 118 of FIG. 1, the lens group 220 of FIG. 2 is similar to the lens group 120 of FIG. 1, the polarized rays 224 of FIG. 2 are similar to the polarized rays 124 of FIG. 1, and the target plane 226 of FIG. 2 is similar to the target plane 126 of FIG. 1. In a further embodiment, the illumination system 200 may further include s-polarized components 214 (not shown) that are similar to the s-polarized components 114 of FIG. 1, and polarized rays 222 (not shown) that are similar to the polarized rays 122 of FIG. 1.

According to the illustrated embodiment, the image 228 may be produced using the maximum amount of the illuminating electromagnetic radiation emanating from the illumination source 202. For example, in one embodiment, each of the polarized rays 222 (not shown) and 224 provides a radiance spatial distribution that replicates the radiant distribution of the illumination source 202 in both a corresponding plane, as can be seen by profile 230, and also in an orthogonal plane (not shown). In one embodiment, by providing each of the polarized rays 222 and 224 to the target plane 226 (as opposed to combining the polarized rays 222 and 224 into a single ray which is then provided to the target plane 226), the polarized rays 222 and 224 may create the image 228 with two separate radiance spatial distributions in the orthogonal plane, as is discussed in FIG. 1. Therefore, according to the illustrated embodiment, the two separate radiance spatial distributions may be combined to form a single more uniform radiance spatial distribution in the orthogonal plane, as can be further seen in FIG. 1. In one embodiment, this single more uniform radiance spatial distribution may result in the image 228 being produced using more of the electromagnetic radiation emitted from the illumination source 202. In a further embodiment, it may result in the image 228 being produced using the maximum amount of the electromagnetic radiation. As such, in one embodiment, the rays 204 and 206 emitted from the illumination source 202 may be more efficiently used to create the image 228.

Modifications, additions, or omissions may be made to the illumination system 200 without departing from the scope of the invention. The components of the illumination system 200 may be integrated or separated. Moreover, the operations of the illumination system 200 may be performed by more, fewer, or other components. For example, the operations of the polarizing beamsplitter 210 may be performed by more than one component.

Figure 3:
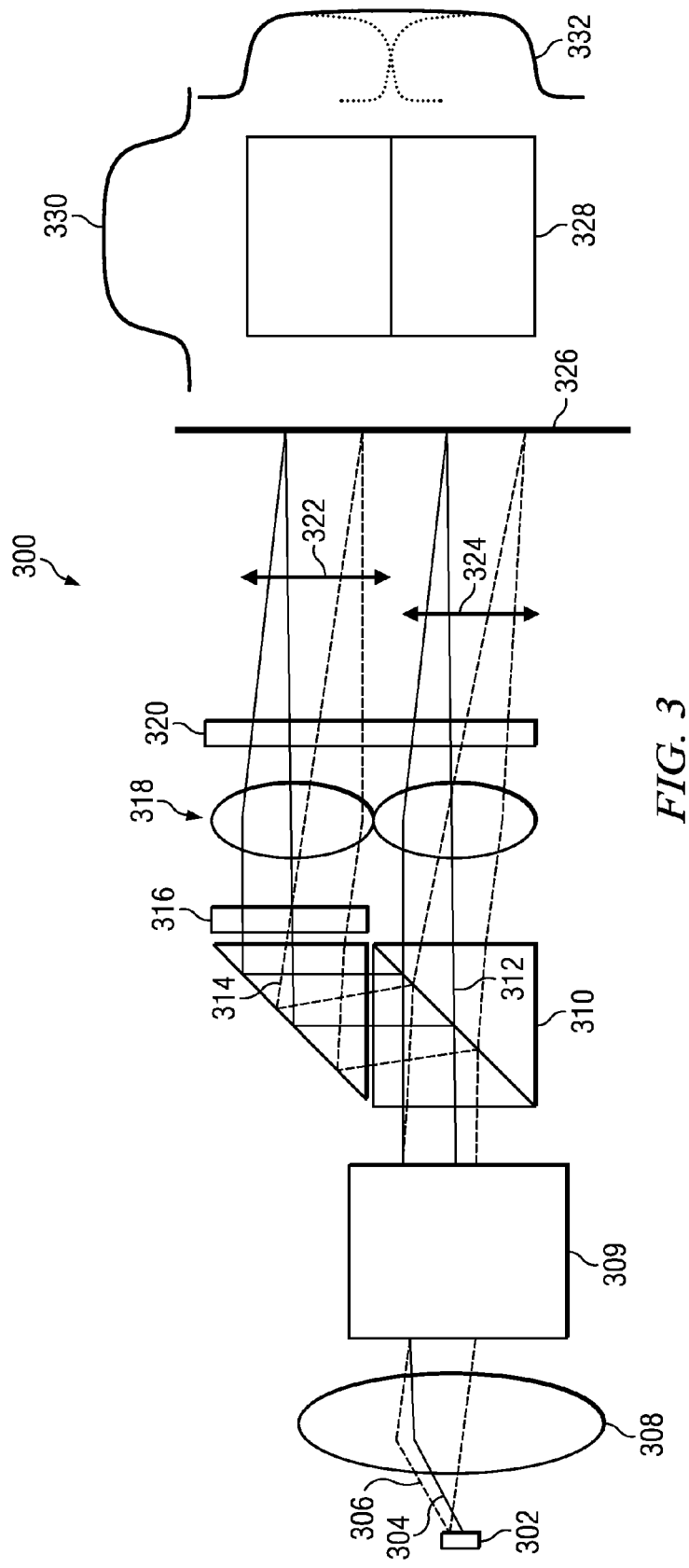
FIG. 3 is a diagram illustrating a side view of one embodiment of an illumination system for delivering rays from a light source to create an image with an illumination distribution that is nearly uniform.

FIG. 3 is a diagram illustrating a side view of one embodiment of an illumination system 300 for delivering rays from a light source to create an image with an illumination distribution that is nearly uniform. In one embodiment, illumination system 300 includes a beam homogenizer component 309 that may convert a non-uniformly distributed beam emitted by an illumination source 302 to a nearly uniformly distributed beam. For instance, a Gaussian spatial profile emitted by the illumination source 302 may be converted to a super-Gaussian, flattened Gaussian, super Lorentzian or Fermi-Dirac profile. As such, the radiance spatial distribution of an image 328 may be controllable, and further may be nearly uniform or homogeneous, resulting in a well balanced image.

According to the illustrated embodiment, the illumination system 300 includes the illumination source 302, rays 304 and 306, a collimating lens 308, a polarizing beamsplitter 310, p-polarized components 312, s-polarized components 314, a half-wave-plate 316, an imaging lens pair 318, a lens group 320, polarized rays 322 and 324, and the target plane 326. In one embodiment, the illumination source 302 of FIG. 3 is similar to the illumination source 102 of FIG. 1, the rays 304 and 306 of FIG. 3 are similar to the rays 104 and 106 of FIG. 1, the collimating lens 308 of FIG. 3 is similar to the collimating lens 108 of FIG. 1, the polarizing beamsplitter 310 of FIG. 3 is similar to the polarizing beamsplitter 110 of FIG. 1, the p-polarized components 312 of FIG. 3 are similar to the p-polarized components 112 of FIG. 1, the s-polarized components 314 of FIG. 3 are similar to the s-polarized components 114 of FIG. 1, the half-wave-plate 316 of FIG. 3 is similar to the half-wave-plate 116 of FIG. 1, the imaging lens pair 318 of FIG. 3 is similar to the imaging lens pair 118 of FIG. 1, the lens group 320 of FIG. 3 is similar to the lens group 120 of FIG. 1, the polarized rays 322 and 324 of FIG. 3 are similar to the polarized rays 122 and 124 of FIG. 1, and the target plane 326 of FIG. 3 is similar to the target plane 126 of FIG. 1.

According to the illustrated embodiment, the illumination system 300 may further include the beam homogenizer component 309. The beam homogenizer component 309 may include any device that may redistribute the radiance emitted from the illumination source 302 across the optical field in a predetermined manner. In one embodiment, the beam homogenizer component 309 may be a radiance spatial converter. In one embodiment, the beam homogenizer component 309 may be a lens. In such an embodiment, the beam homogenizer component 309 may include a group of negative and positive power aspherical singlets. In another embodiment, the beam homogenizer component 309 may be a thick singlet with concave and convex aspherical surfaces on either side. In yet another embodiment, the beam homogenizer component 309 may consist of a lens array and an aspherical lens. In a further embodiment, the beam homogenizer component 309 may consist of an "engineered lenslet array".

According to the illustrated embodiment, the beam homogenizer component 309 may be disposed between the collimating lens 308 and the polarizing beamsplitter 310. As such, the beam homogenizer component 309 may receive the rays 304 and 306 from the collimating lens 308, redistribute the radiance of the rays 304 and 306 across the optical field in a predetermined manner, and pass the rays 304 and 306 to the polarizing beamsplitter 310. In further embodiments, the beam homogenizer component 309 may be located in any other suitable location in the illumination system 300.

As is discussed above, the beam homogenizer component 309 may redistribute the radiance emitted from the illumination source 302 across the optical field in a predetermined manner. In one embodiment, this may allow luminance distribution across the optical field to be controllable and/or arbitrary. For example, in an embodiment where the radiation emanating from illumination source 302 has a spatial profile approximated by a Gaussian, the beam homogenizer component 309 may convert the nearly Gaussian profile to a super-Gaussian, flattened-Gaussian, super-Lorentzian or Fermi-Dirac profile that approximates a flat-top or uniform distribution across the optical field. In such an embodiment, the image 328 may have a nearly uniform radiance spatial distribution that replicates the converted radiant distribution of the illumination source 302 in both the corresponding plane, as can be seen by profile 330, and in the two orthogonal coordinates of the target plane, as can be seen by profile 332.

Accordingly, as is further discussed in FIG. 1, by providing each of the polarized rays 322 and 324 to the target plane 326 (as opposed to combining the polarized rays 322 and 324 into a single ray which is then provided to the target plane 326), the polarized rays 322 and 324 may create the image 328 with two separate converted radiance spatial distributions in the orthogonal plane, as can be seen by profile 332. Therefore, according to the illustrated embodiment, the two separate converted radiance spatial distributions may be combined to form a single nearly uniform, or homogenous, radiance spatial distribution in the orthogonal plane, as can be further seen by profile 332. In one embodiment, this single nearly uniform radiance spatial distribution may result in the image 328 being produced using more of the electromagnetic radiation emitted from the illumination source 302. In a further embodiment, it may result in the image 328 being produced using the maximum amount of the electromagnetic radiation. As such, in one embodiment, the rays 304 and 306 emitted from the illumination source 302 and converted by the beam homogenizer component 309 may be more efficiently used to create the image 328. Furthermore, the radiance spatial distribution of the image 328 may be controllable, and further may be nearly uniform, or homogenous, resulting in a well balanced image.

Modifications, additions, or omissions may be made to the illumination system 300 without departing from the scope of the invention. The components of the illumination system 300 may be integrated or separated. Moreover, the operations of the illumination system 300 may be performed by more, fewer, or other components. For example, the operations of the beam homogenizer component 309 may be performed by more than one component.

Figure 4:
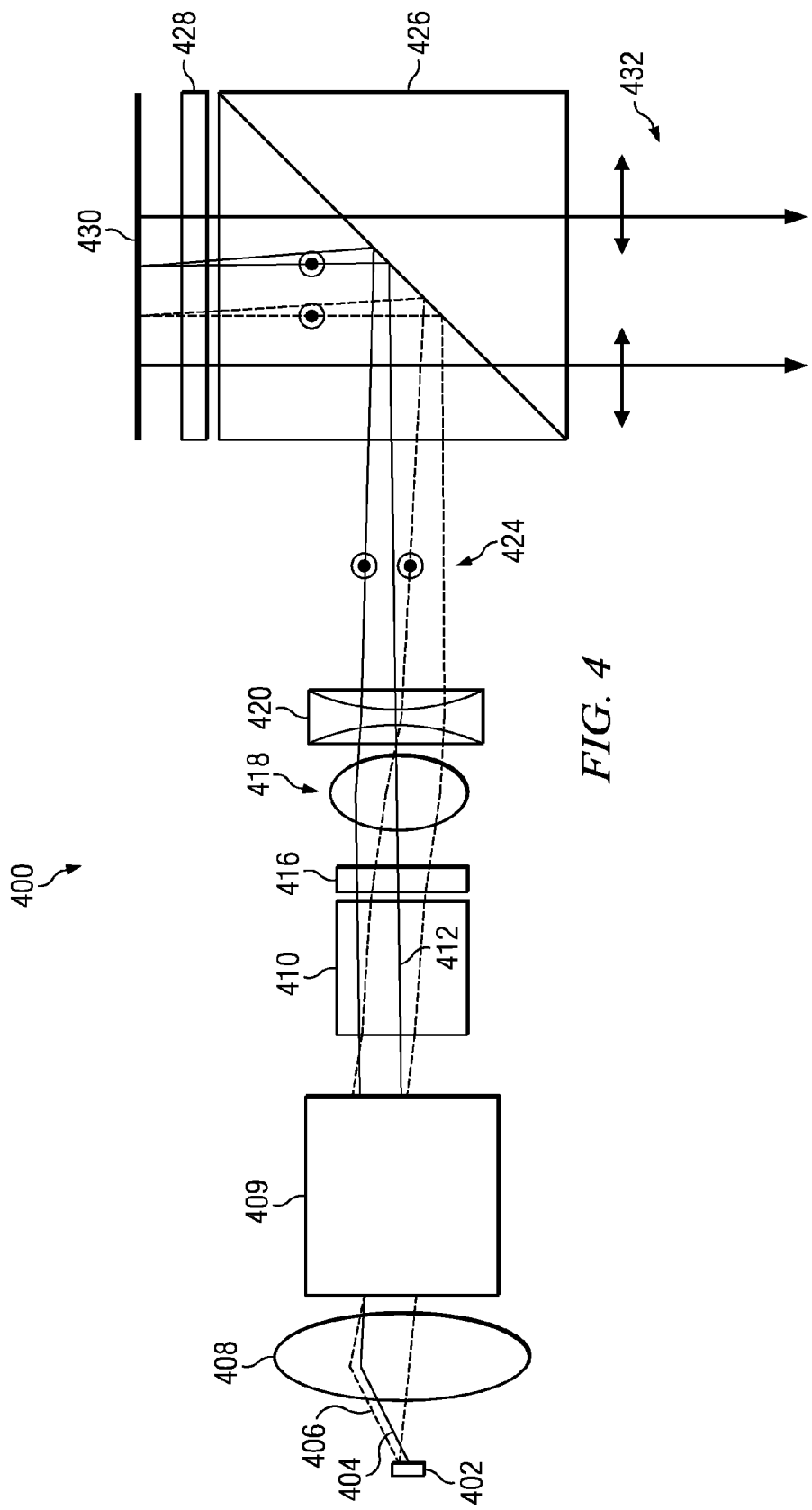
FIG. 4 is a diagram illustrating a top view of one embodiment of an illumination system with an image generator for creating an image with an illumination distribution that is nearly uniform.

FIG. 4 is a diagram illustrating a top view of one embodiment of an illumination system 400 with an image generator for creating an image with an illumination distribution that is nearly uniform. In one embodiment, illumination system 400 includes an image generator 430 that reflects the polarized rays 424 towards a target plane to create an image. As such, the radiance spatial distribution of the image on the target plane may be nearly uniform. Furthermore, illumination system 400 further includes various elements, such as the image generator 430, a second polarizing beamsplitter 426, and a quarter-wave-plate 428, that enable the polarized rays 424 to pass through a compact arrangement to the image generator 430 and back along an identical path to a target plane as transmitted rays 432 while the rays remain separated and substantially polarized. As such, both of the transmitted rays 432 are separately delivered to target plane, resulting in a more efficient and homogenized delivery of the rays.

According to the illustrated embodiment, the illumination system 400 includes an illumination source 402, rays 404 and 406, a collimating lens 408, a beam homogenizer component 409, a polarizing beamsplitter 410, p-polarized components 412, a half-wave-plate 416, an imaging lens pair 418, a lens group 420, and polarized rays 424. In one embodiment, the illumination source 402 of FIG. 4 is similar to the illumination source 202 of FIG. 2, the rays 404 and 406 of FIG. 4 are similar to the rays 204 and 206 of FIG. 2, the collimating lens 408 of FIG. 4 is similar to the collimating lens 208 of FIG. 2, the beam homogenizer component 409 of FIG. 4 is similar to the beam homogenizer component 309 of FIG. 3, the polarizing beamsplitter 410 of FIG. 4 is similar to the polarizing beamsplitter 210 of FIG. 2, the p-polarized components 412 of FIG. 4 are similar to the p-polarized components 212 of FIG. 2, the half-wave-plate 416 of FIG. 4 is similar to the half-wave-plate 216 of FIG. 2, the imaging lens pair 418 of FIG. 4 is similar to the imaging lens pair 218 of FIG. 2, the lens group 420 of FIG. 4 is similar to the lens group 220 of FIG. 2, and the polarized rays 424 of FIG. 4 are similar to the polarized rays 224 of FIG. 2. In a further embodiment, the illumination system 400 may further include s-polarized components 414 (not shown) that are similar to the s-polarized components 214 of FIG. 2, and polarized rays 422 (not shown) that are similar to the polarized rays 222 of FIG. 2. In one embodiment, the term "polarized rays 424" is meant to refer to both the polarized rays 424 and the polarized rays 422 (which are not shown in this top view).

According to the illustrated embodiment, the illumination system 400 further includes the second polarizing beamsplitter 426, the quarter-wave-plate 428, and the image generator 430. In one embodiment, the second polarizing beamsplitter 426 may include any device that may reflect nearly all of the polarized rays 424 and transmit nearly none of the polarized rays 424 through its diagonal plane. For example, in an embodiment where the polarized rays 424 are s-polarized (relative to the plane of the s-polarization discussed in FIG. 1), the second polarizing beam splitter 426 may receive the polarized rays 424 and reflect nearly the entire radiant flux of the polarized rays 424 and transmit nearly none of the radiant flux of the polarized rays 424. In such an example, nearly all of the polarized rays 424 (and their radiant flux) are reflected towards the quarter-wave-plate 428.

Quarter-wave-plate 428 may include any device that receives the polarized rays 424 from the second polarizing beamsplitter 426 and converts the polarized rays 424 to a circular polarization. In one embodiment, the quarter-wave-plate fast axis is rotated by 45° to the plane of linear polarization, thus the polarized rays 424 may become circularly polarized in a clockwise sense. In such an embodiment, the polarized rays 424 may be converted from a s-polarization to a clockwise circular polarization. In a further embodiment, after converting the polarized rays 424, the quarter-wave-plate 428 may pass the polarized rays 424 to the image generator 430.

Image generator 430 may include any device that receives the polarized rays 424 from the quarter-wave-plate 428 and reflects or transmits the polarized rays 424 back through the quarter-wave-plate 428. In one embodiment, the image generator 430 may be a spatial modulator. In such an embodiment, the spatial modulator may consist of an array of mirrors, a Digital Micro-mirror Device (DMD), a Micro Electrostatic Mirror System (MEMS), and/or a reflective Liquid Crystal Device (LCD). In further embodiments, the image generator 430 may be any other suitable device. In one embodiment, the image generator 430 may attribute spatial information, thus performing as an object in an imaging system. In a further embodiment, the image generator 430 may receive the polarized rays 424 with a super-Gaussian profile that approximates a flat-top or uniform distribution across the optical field, as is discussed in FIG. 3. In such an embodiment, the entire area of image generator 430 may be illuminated by the polarized rays 424 with a nearly uniform, or homogeneous, radiance across the optical field.

In an additional embodiment, the image generator 430 may reflect the polarized rays 424 back through the quarter-wave-plate 428. Accordingly, the polarized rays 424 may propagate in a counterclockwise sense towards the quarter-wave-plate 428. In such an embodiment, the quarter-wave-plate 428 may rotate the polarized rays 424 to be p-polarized (relative to the plane of the s-polarization discussed above). In one embodiment, by rotating the polarized rays 424 to be p-polarized, the polarized rays 424 may be nearly fully transmitted back through the polarizing beamsplitter 426 towards a target plane (not shown). According to the illustrated embodiment, the polarized rays 424 that are nearly fully transmitted back through the polarizing beamsplitter 426) towards the target plane may be referred to as transmitted rays 432.

In one embodiment, the transmitted rays 432 may carry the spatially optical information. As such, the transmitted rays 432 may have a super-Gaussian profile that approximates a flat-top or uniform distribution across the optical field. Therefore, in one embodiment, the entire area of the target plane (not shown) may be illuminated by the transmitted rays 432 with a nearly uniform, or homogeneous, radiance across the optical field. In such an embodiment, the transmitted rays 432 may create an image on the target plane with a nearly uniform radiance. In one embodiment, the target plane may be similar to the target plane 128 of FIG. 1.

Modifications, additions, or omissions may be made to the illumination system 400 without departing from the scope of the invention. The components of the illumination system 400 may be integrated or separated. Moreover, the operations of the illumination system 400 may be performed by more, fewer, or other components. For example, the operations of the image generator 430 may be performed by more than one component.

Figure 5:
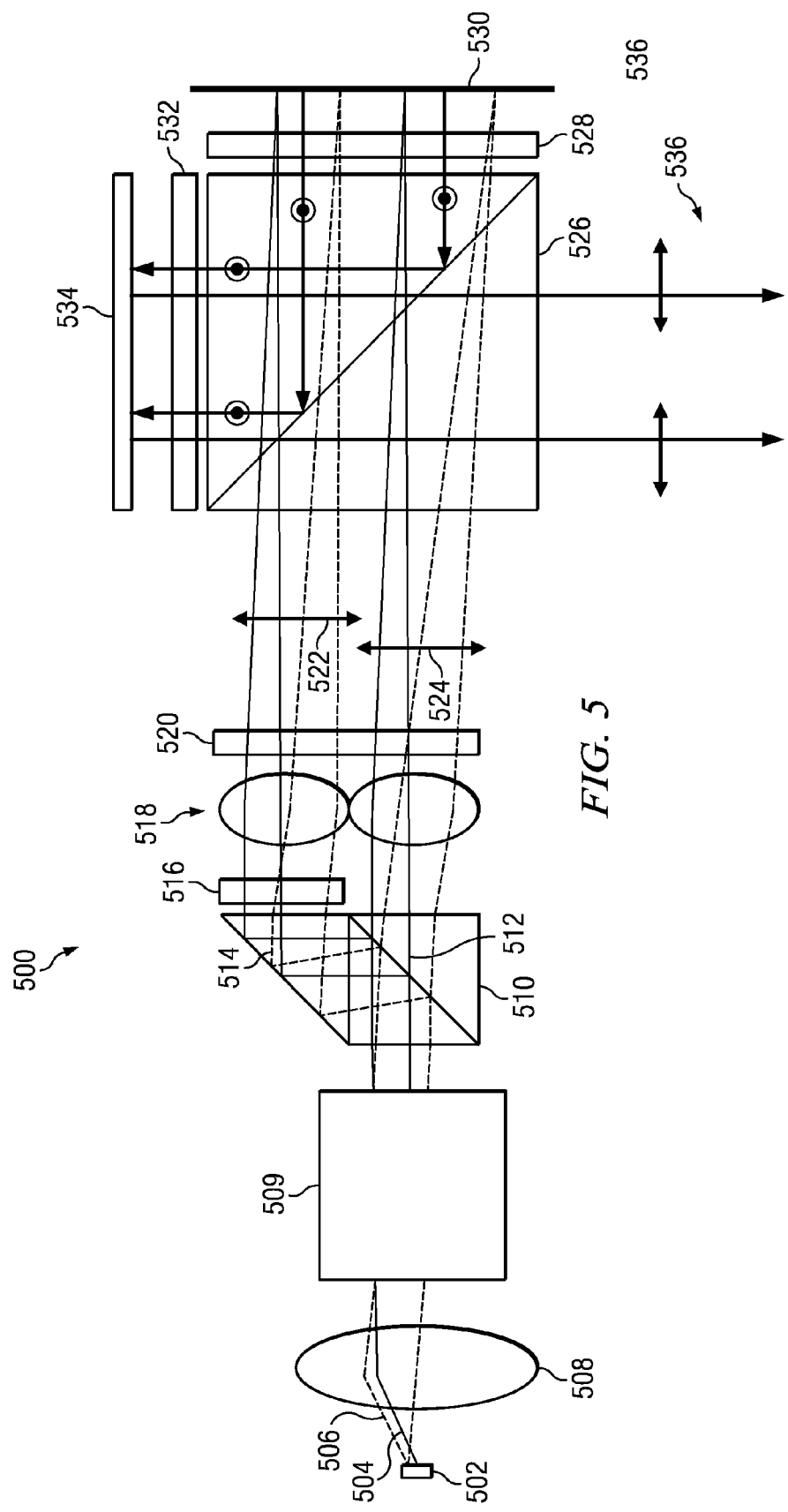
FIG. 5 is a diagram illustrating a side view of a further embodiment of an illumination system with an image generator for creating an image with an illumination distribution that is nearly uniform.

FIG. 5 is a diagram illustrating a side view of a further embodiment of an illumination system 500 with an image generator for creating an image with an illumination distribution that is nearly uniform. In one embodiment, the illumination system 500 includes an image generator 530 that reflects the polarized rays 522 and 524 towards a target plane to create an image. As such, the radiance spatial distribution of the image on the target plane may be nearly uniform. Furthermore, illumination system 500 further includes various elements, such as the image generator 530, a second polarizing beamsplitter 526, a quarter-wave-plate 528, a second quarter-wave-plate 532, and a mirror 534, that enable the polarized rays 522 and 524 to pass through a compact arrangement to the image generator 530 and back along an identical path to a target plane as transmitted rays 532 while the rays remain separated and substantially polarized. As such, both of the transmitted rays 532 are separately delivered to target plane, resulting in a more efficient and homogenized delivery of the rays.

According to the illustrated embodiment, the illumination system 500 includes an illumination source 502, rays 504 and 506, a collimating lens 508, a beam homogenizer component 509, a polarizing beamsplitter 510, p-polarized components 512, s-polarized components 514, a half-wave-plate 516, an imaging lens pair 518, a lens group 520, and polarized rays 522 and 524. In one embodiment, the illumination source 502 of FIG. 5 is similar to the illumination source 402 of FIG. 4, the rays 504 and 506 of FIG. 5 are similar to the rays 404 and 406 of FIG. 4, the collimating lens 508 of FIG. 5 is similar to the collimating lens 408 of FIG. 4, the beam homogenizer component 509 of FIG. 5 is similar to the beam homogenizer component 409 of FIG. 4, the polarizing beamsplitter 510 of FIG. 5 is similar to the polarizing beamsplitter 410 of FIG. 4, the p-polarized components 512 of FIG. 5 are similar to the p-polarized components 412 of FIG. 4, the s-polarized components 514 of FIG. 5 are similar to the s-polarized components 414 of FIG. 4, the half-wave-plate 516 of FIG. 5 is similar to the half-wave-plate 416 of FIG. 4, the imaging lens pair 518 of FIG. 5 is similar to the imaging lens pair 418 of FIG. 4, the lens group 520 of FIG. 5 is similar to the lens group 420 of FIG. 4, and the polarized rays 522 and 524 of FIG. 5 are similar to the polarized rays 422 and 424 of FIG. 4.

According to the illustrated embodiment, the illumination system 500 further includes the second polarizing beamsplitter 526, the quarter-wave-plate 528, the image generator 530, the second quarter-wave-plate 532, and the mirror 534. In one embodiment, the second polarizing beamsplitter 526 may include any device that may transmit nearly all of the polarized rays 522 and 524 and reflect nearly none of the polarized rays 522 and 524 through its diagonal plane. For example, in an embodiment where the polarized rays 522 and 524 are p-polarized (relative to the plane of the s-polarization discussed in FIG. 4), the second polarizing beam 526 may receive the polarized rays 522 and 524 and transmit nearly the entire radiant flux of the polarized rays 522 and 524 and reflect nearly none of the radiant flux of the polarized rays 522 and 524. In such an example, nearly all of the polarized rays 522 and 524 (and their radiant flux) are transmitted towards the quarter-wave-plate 528. In one embodiment, the second polarizing beamsplitter 526 of FIG. 5 may differ from the second polarizing beamsplitter 426 of FIG. 4 in that the second polarizing beamsplitter 526 is disposed in illumination system 500 so as to transmit nearly all of the radiant flux, while the second polarizing beamsplitter 426 of FIG. 4 may be disposed in illumination system 400 so as to reflect nearly all of the radiant flux.

Quarter-wave-plate 528 may include any device that receives the polarized rays 522 and 524 from the second polarizing beamsplitter 526 and converts the polarized rays 522 and 524 to a circular polarization. In one embodiment, the polarized rays 522 and 524 may be circularly polarized in a clockwise sense. In such an embodiment, the polarized rays 522 and 524 may be converted from a p-polarization to a clockwise circular polarization. In a further embodiment, after converting the polarized rays 522 and 524, the quarter-wave-plate 528 may pass the polarized rays 522 and 524 to the image generator 530.

Image generator 530 may include any device that receives the polarized rays 522 and 524 from the quarter-wave-plate 528 and reflects or transmits the polarized rays 522 and 524 back through the quarter-wave-plate 528. In one embodiment, the image generator 530 may be a spatial modulator. In such an embodiment, the spatial modulator may consist of an array of mirrors, a Digital Micro-mirror Device (DMD), a Micro Electrostatic Mirror System (MEMS), and/or a reflective Liquid Crystal Device (LCD). In further embodiments, the image generator 530 may be any other suitable device. In one embodiment, the image generator 530 may attribute spatial information, thus performing as an object in an imaging system. In a further embodiment, the image generator 530 may receive the polarized rays 522 and 524 with a super-Gaussian profile that approximates a flat-top or uniform distribution across the optical field, as is discussed in FIG. 3. In such an embodiment, the entire area of image generator 530 may be illuminated by the polarized rays 522 and 524 with a nearly uniform, or homogeneous, radiance across the optical field.

In an additional embodiment, the image generator 530 may reflect the polarized rays 522 and 524 back through the quarter-wave-plate 528. Accordingly, the polarized rays 522 and 524 may propagate in a counterclockwise sense towards the quarter-wave-plate 528. In such an embodiment, the quarter-wave-plate 528 may further rotate the polarized rays 522 and 524 so that they become s-polarized. In one embodiment, by rotating the polarized rays 522 and 524 to be s-polarized, the polarized rays 522 and 524 may be nearly fully reflected by the second polarizing beamsplitter 526 to the second quarter-wave-plate 532.

Second quarter-wave-plate 532 may include any device that receives the polarized rays 522 and 524 reflected by the second polarizing beamsplitter 526 and converts the polarized rays 522 and 524 to a circular polarization. In one embodiment, the polarized rays 522 and 524 may be circularly polarized in a clockwise sense. In such an embodiment, the polarized rays 522 and 524 may be converted from a s-polarization to a clockwise circular polarization. In a further embodiment, after converting the polarized rays 522 and 524, the second quarter-wave-plate 528 may pass the polarized rays 522 and 524 to the mirror 534.

Mirror 534 may include any device that receives the polarized rays 522 and 524 from the second quarter-wave-plate 532 and reflects the polarized rays 522 and 524 back through the second quarter-wave-plate 532. According to one embodiment, the mirror 534 may reflect the polarized rays 522 and 524 in a counterclockwise sense back to the second quarter-wave-plate 528. In such an embodiment, the second quarter-wave-plate 532 may further rotate the polarized rays 522 and 524 so that they are p-polarized (relative to the plane of the s-polarization discussed above). In one embodiment, by rotating the polarized rays 522 and 524 to be p-polarized, the polarized rays 522 and 524 may be nearly fully transmitted back through the second polarizing beamsplitter 526 towards a target plane (not shown). According to the illustrated embodiment, the polarized rays 522 and 524 that are nearly fully transmitted back through the second polarizing beamsplitter 526 towards the target plane may be referred to as transmitted rays 536.

In one embodiment, the transmitted rays 536 may carry the spatially optical information. As such, the transmitted rays 536 may have a super-Gaussian profile that approximates a flat-top or uniform distribution across the optical field. Therefore, in one embodiment, the entire area of the target plane (not shown) may be illuminated by the transmitted rays 536 with a nearly uniform, or homogeneous, radiance across the optical field. In such an embodiment, the transmitted rays 536 may create an image on the target plane with a nearly uniform radiance. In one embodiment, the target plane may be similar to the target plane 128 of FIG. 1.

Modifications, additions, or omissions may be made to the illumination system 500 without departing from the scope of the invention. The components of the illumination system 500 may be integrated or separated. Moreover, the operations of the illumination system 500 may be performed by more, fewer, or other components. For example, the operations of the image generator 530 may be performed by more than one component.

Figure 6:
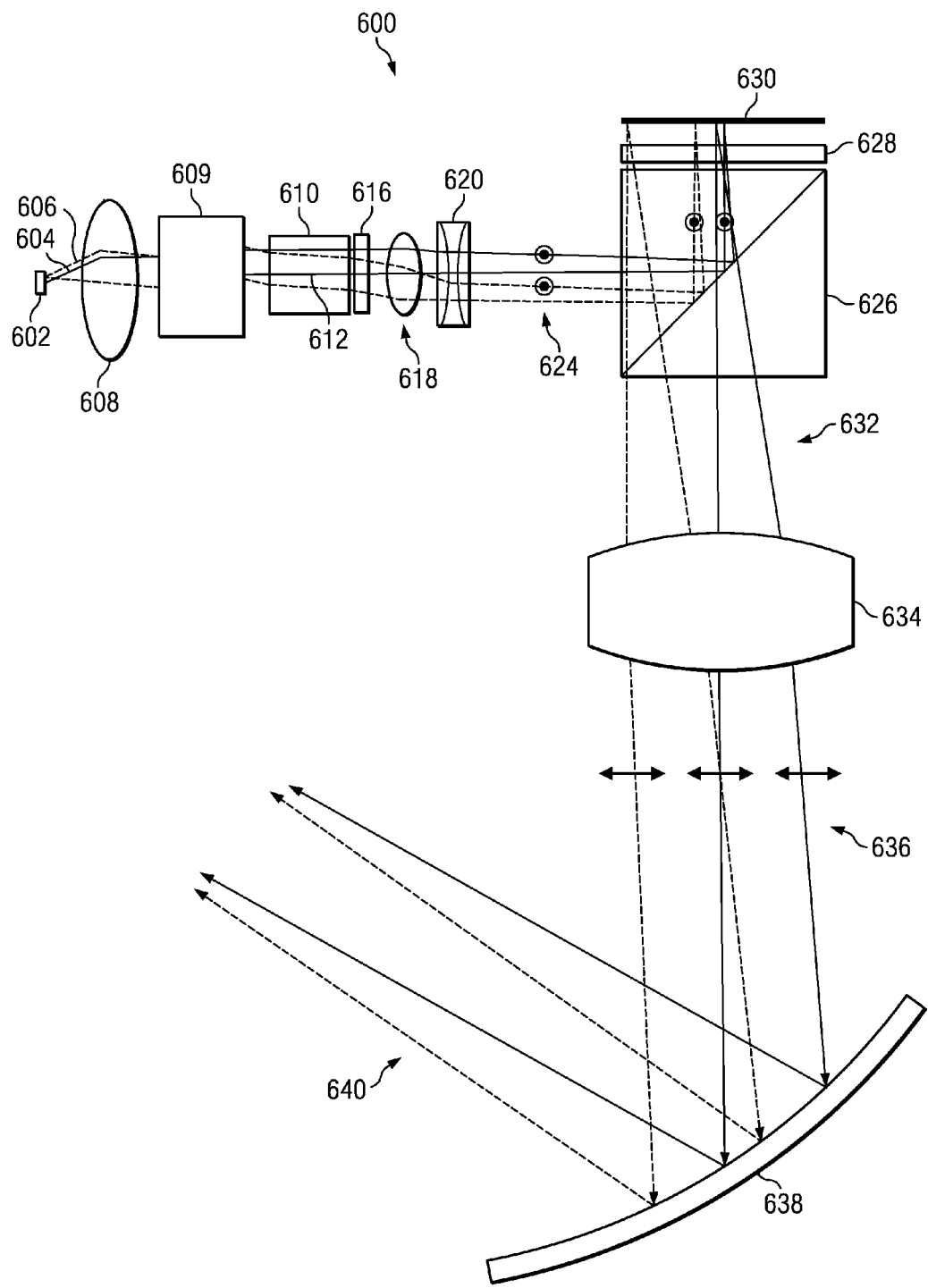
FIG. 6 is a diagram illustrating a top view of one embodiment of an illumination system with a component for creating an image with an illumination distribution that is nearly uniform.

FIG. 6 is a diagram illustrating a top view of one embodiment of an illumination system 600 with a component for creating an image with an illumination distribution that is nearly uniform. In one embodiment, illumination system 600 includes a component 638 that reflects the transmitted rays 632 towards a target plane to create an image. As such, the radiance spatial distribution of the image on the target plane may be nearly uniform.

According to the illustrated embodiment, the illumination system 600 includes an illumination source 602, rays 604 and 606, a collimating lens 608, a beam homogenizer component 609, a polarizing beamsplitter 610, p-polarized components 612, a half-wave plate 616, an imaging lens pair 618, a lens group 620, polarized rays 624, a second polarizing beamsplitter 626, a quarter-wave-plate 628, an image generator 630, and the transmitted rays 632. In one embodiment, the illumination source 602 of FIG. 6 is similar to the illumination source 402 of FIG. 4, the rays 604 and 606 of FIG. 6 are similar to the rays 404 and 406 of FIG. 4, the collimating lens 608 of FIG. 6 is similar to the collimating lens 408 of FIG. 4, the beam homogenizer component 609 of FIG. 6 is similar to the beam homogenizer component 409 of FIG. 4, the polarizing beamsplitter 610 of FIG. 6 is similar to the polarizing beamsplitter 410 of FIG. 4, the p-polarized components 612 of FIG. 6 are similar to the p-polarized components 412 of FIG. 4, the half-wave-plate 616 of FIG. 6 is similar to the half-wave-plate 416 of FIG. 4, the imaging lens pair 618 of FIG. 6 is similar to the imaging lens pair 418 of FIG. 4, the lens group 620 of FIG. 6 is similar to the lens group 420 of FIG. 4, the polarized rays 624 of FIG. 6 are similar to the polarized rays 424 of FIG. 4, the second polarizing beamsplitter 626 of FIG. 6 is similar to the second polarizing beamsplitter 426 of FIG. 4, the quarter-wave-plate 628 of FIG. 6 is similar to the quarter-wave-plate 428 of FIG. 4, the image generator 630 of FIG. 6 is similar to the image generator 430 of FIG. 4, and the transmitted rays 632 of FIG. 6 are similar to the transmitted rays 432 of FIG. 4. In a further embodiment, the illumination system 600 may further include s-polarized components 614 (not shown) that are similar to the s-polarized components 414 of FIG. 4, and polarized rays 622 (not shown) that are similar to polarized rays 422 of FIG. 4. In one embodiment, the term "polarized rays 624" is meant to refer to both the polarized rays 624 and the polarized rays 622 (which are not shown in this top view).

According to the illustrated embodiment, the illumination system 600 further includes an imaging lens 634 and the component 638. Imaging lens 634 may include any lens that receives the transmitted rays 632 after they are transmitted through the second polarizing beamsplitter 626. According to one embodiment, the transmitted rays 632 received at the imaging lens 634 may be p-polarized, as is discussed in FIG. 4. In one embodiment, the imaging lens 634 may include a single lens. In a further embodiment, the imaging lens 634 may include multiple lenses arranged as a lens group. In another embodiment, the imaging lens 634 may include any combination of lenses, singlet lens elements, prisms, and/or diffractive elements. According to the illustrated embodiment, the imaging lens 634 includes a lens group. In one embodiment, after receiving the transmitted rays 632, the imaging lens 634 may pass the transmitted rays 632 to the component 638. According to additional embodiments, the imaging lens 634 may refract the transmitted rays 632, diffract the transmitted rays 632, or adjust the transmitted rays 632 in any way. For example, the transmitted rays 632 may be magnified so that an image may be enlarged so as to be viewed by a user. According to the illustrated embodiment, the transmitted rays 632 that pass through the imaging lens 634 to the component 638 may be referred to as propagating rays 636.

Component 638 may include any combiner for receiving the propagating rays 636 and subsequently reflecting them to a target plane (not shown) in order to create an image that may be viewed by a user. The reference to a combiner alludes to the combination of reflected optical rays with transmitted optical rays by the component 638. In one embodiment, the component 638 may be a partially reflective mirror that partially reflects the propagating rays 636. In one embodiment, the component 638 may reflect nearly all of the propagating rays 636 without depolarizing the propagating rays 636. In one embodiment, the component 638 and the imaging lens 634 may work together so as to form an imaging unit. According to the illustrated embodiment, the component 638 may constitute a reflective eyepiece that collimates the propagating rays 636. As such, the illumination system 600 including the component 638 may be a Head-Up Display (HUD) illumination system, or a Helmet-Mounted Display (HMD) illumination system.

In one embodiment, the component 638 may include a preferential spectral coating on its concave surface. In such an embodiment, the propagating rays 636 may be preferentially reflected towards the target plane. In certain embodiments, the partial reflectivity of the component 638 may be based on preferential polarization such that said incident propagating rays 636 (being p-polarized) are preferentially reflected. In one embodiment, the spectrally preferential reflectivity of the component 638 may result in the partial reflection of the projected illumination at a visible wavelength of 525 nm with a broadband spectrum of approximately 50 nm FWHM (Full-Width Half-Maximum), while the component 638 may also be partially transmissive anywhere within the entire visible spectrum (thus allowing outer scenery images having any wavelength in the entire visible spectrum to be transmitted). In an additional embodiment, the spectrally preferential reflectivity of the component 638 may result in the partial reflection of the projected illumination at any wavelength within the entire visible spectrum, while the component 638 may also be partially transmissive anywhere within the entire visible spectrum. In such an embodiment, the spectrally preferential reflectivity and the minimum reflectivity of the component 638 may be complementary. In a further embodiment, the spectrally preferential reflectivity of the component 638 may result in the simultaneous partial reflection of projected illumination at multiple different bandwidths, such as, for example, 480 nm, 525 nm, and 650 nm. In one embodiment, the anti-reflective coating may allow one or more outer scenery images (from the surroundings) to be transmitted, and may further eliminate one or more ghost images. Accordingly, component 638 may form an overlapping image of the outer scenery and the generated image on the target plane. According to the illustrated embodiment, the propagating rays 636 that are reflected by the component 638 are referred to as reflected waves 640

In one embodiment, the reflected rays 640 may carry the spatially optical information. As such, the reflected rays 640 may have a super-Gaussian profile that approximates a flat-top or uniform distribution across the optical field. Therefore, in one embodiment, the entire area of the target plane (not shown) may be illuminated by the reflected rays 640 with a nearly uniform, or homogeneous, radiance across the optical field. In such an embodiment, the reflected rays 640 may create an image on the target plane with a nearly uniform radiance. In one embodiment, the target plane may be similar to the target plane 128 of FIG. 1.

Modifications, additions, or omissions may be made to the illumination system 600 without departing from the scope of the invention. The components of the illumination system 600 may be integrated or separated. Moreover, the operations of the illumination system 600 may be performed by more, fewer, or other components. For example, the operations of the component 638 may be performed by more than one component.

Figure 7:
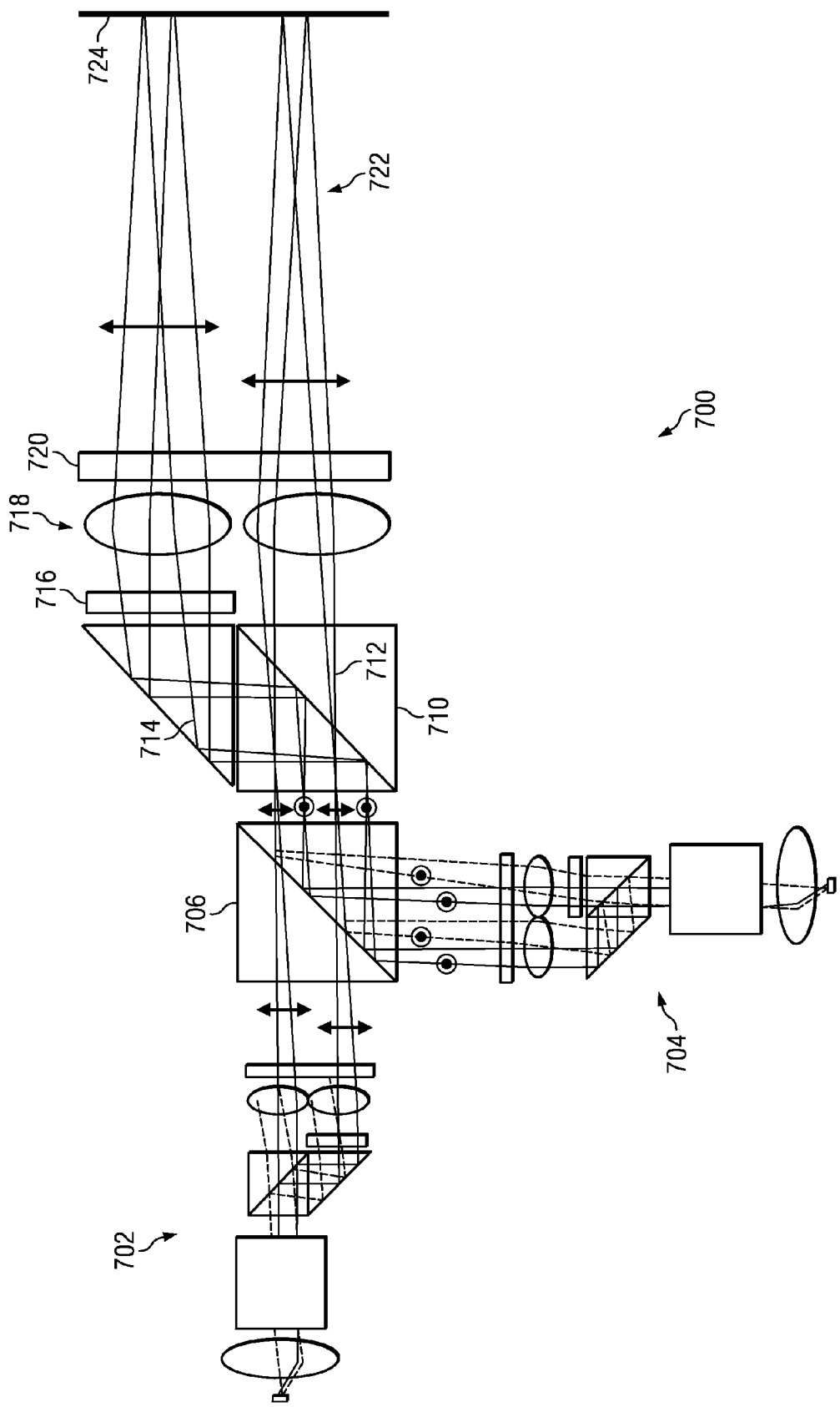
FIG. 7 is a diagram illustrating a side view of one embodiment of an illumination system that combines the rays emitted from two unpolarized illuminations sources.

FIG. 7 is a diagram illustrating a side view of one embodiment of an illumination system 700 that combines the rays emitted from two unpolarized illumination sources. In one embodiment, the illumination system 700 includes a first polarizing beam splitter 706 that combines the rays propagating from both subsystems 702 and 704. As such, an image may be created on a target plane 724 using both of the subsystems 702 and 704. In certain embodiments, this may allow images from each of the subsystems 702 and 704 to be superimposed on the target plane 724.

According to the illustrated embodiment, the illumination system 700 includes the subsystems 702 and 704, the first polarizing beamsplitter 706, a second polarizing beam splitter 710, a half-wave-plate 716, an imaging lens pair 718, a lens group 720, and the target plane 724. In one embodiment, subsystems 702 and 704 may each be similar to illumination system 300 of FIG. 3. As such, each of the subsystems 702 and 704 may emit radiation (or rays) with a super-Gaussian profile that approximates a flat-top or uniform distribution across the optical field. In another embodiment, subsystems 702 and 704 may each consist of a system that delivers one or more rays after the rays have been collimated, whose radiance profile has been redistributed, and which have been polarized in orthogonal senses. In a further embodiment, subsystems 702 and 704 may be identical to each other, or may be different from each other. In certain embodiments, subsystems 702 and 704 may emit radiation (or rays) having any suitable wavelength. For example, subsystems 702 and 704 may emit rays having wavelengths corresponding to any suitable color, such as red, green, or blue. In certain embodiments, subsystems 702 and 704 may emit rays having similar wavelengths, or different wavelengths. For example, subsystem 702 may emit rays having wavelengths corresponding to red, while subsystem 704 may emit rays having wavelengths corresponding to blue. In such embodiments, the colors from each subsystem 702 and 704 may be superimposed in order to form a combined, full gamut color image. In an embodiment comprising three emitters that each emit a distinct color (such as red, green and blue), the illumination system 700 may create a color image using a single image generator by the individual emission magnitudes.

In one embodiment, subsystems 702 and 704 may each include unpolarized, spectrally similar, radiant sources. According to the illustrated embodiment, the rays emitted from subsystems 702 and 704 may propagate to the first polarizing beamsplitter 706. Although the illustrated embodiment includes two subsystems 702 and 704, the illumination system 700 may include any other suitable number of subsystems, such as less than two subsystems or more than two subsystems.

First polarizing beamsplitter 706 may include any device that combines the rays received from both subsystems 702 and 704. For example, the first polarizing beamsplitter 706 may include a prism. In one embodiment, the first polarizing beamsplitter 706 may combine the orthogonal radiation (or rays) received from both subsystems 702 and 704. In a further embodiment, the first polarizing beamsplitter 706 may combine the rays from subsystems 702 and 704 having a similar spectral radiance. In one embodiment, the combination of the rays may be by mutually orthogonal polarization. In a further embodiment, once the rays are combined, the combined rays may propagate to the second polarizing beam splitter 710.

Second polarizing beamsplitter 710 may include any device that splits the combined rays into polarized components. For example, the second polarizing beamsplitter 710 may include a prism. In one embodiment, the second polarizing beamsplitter 710 may split the combined rays into p-polarized components 712 and s-polarized components 714. In a further embodiment, once the combined rays are split into the p-polarized components 712 and the s-polarized components 714, the p-polarized components 712 may propagate directly to the imaging lens pair 718, and the s-polarized components 714 may propagate to the half-wave-plate 716 before propagating to the imaging lens pair 718.

Half-wave-plate 716 may include any device that rotates the s-polarized components 714 to a p-polarized electromagnetic field. In one embodiment, the half-wave-plate 716 rotates the polarization of the s-polarized components 714 by 90 degrees when the fast-axis of the half-wave-plate 716 is rotated at 45 degrees. In one embodiment, the rotated fast axis may rotate the s-polarized components 714 to the p-polarized electromagnetic field. In a further embodiment, by rotating the s-polarized components 714 to the p-polarized electromagnetic field, the s-polarized components 714 are rotated into p-polarized components 714. In one embodiment, the rotation of the s-polarized components 714 into the p-polarized components 714 may be referred to as likewise polarization (e.g., both the p-polarized components 712 and the p-polarized components 714 now have the same polarization). According to one embodiment, once the s-polarized components 714 are rotated into the p-polarized components 714, the p-polarized components 714 may propagate to the imaging lens pair 718.

Imaging lens pair 718 may include any lens that receives the p-polarized components 712 from the polarizing beamsplitter 710 and the p-polarized components 714 from the half-wave-plate 716. In one embodiment, the imaging lens pair 718 may include a pair of lenses, or a single lens. In a further embodiment, the imaging lens pair 718 may include multiple lenses arranged as a lens group. In another embodiment, the imaging lens pair 718 may include any combination of lenses, singlet lens elements, prisms, and/or diffractive elements. In one embodiment, after receiving the p-polarized components 712 and 714, the imaging lens pair 718 may pass the p-polarized components 712 and 714 to the lens group 720. According to additional embodiments, the imaging lens pair 718 may refract the p-polarized components 712 and 714, diffract the p-polarized components 712 and 714, or adjust the p-polarized components 712 and 714 in any way.

Lens group 720 may include any lens that receives the p-polarized components 712 and 714 from the imaging lens pair 718. In one embodiment, the lens group 720 may include a single lens. In a further embodiment, the lens group 720 may include multiple lenses arranged as a lens group. In another embodiment, the lens group 720 may include any combination of lenses, singlet lens elements, prisms, and/or diffractive elements.

According to additional embodiments, the lens group 720 may refract the p-polarized components 712 and 714, diffract the p-polarized components 712 and 714, or adjust the p-polarized components 712 and 714 in any way. For example, in certain embodiments, the lens group 720 may tailor the contour of the p-polarized components 712 and 714 so that image 728 produced by the illumination system 700 may be any suitable shape, such as a square, rectangle, circle, ellipse, or any other suitable shape. In certain embodiments, the tailoring of the contour of the p-polarized components 712 and 714 may allow the image produced by the illumination system 700 to match the pattern of the target plane 724. For example, in certain embodiments where the target plane 724 has a circular shape, the tailoring of the contour of the p-polarized components 712 and 714 may allow the image produced to be circular, so that it matches the target plane 724. In one embodiment, this may increase the efficiency of the illumination system 700 by preventing optical power from being used to create an image with a cross-section that does not fit on the target plane 724, is too big for the target plane 724, or is improperly shaped for the target plane 724. In certain embodiments, the lens group 720 may have any suitable shape or size suitable for tailoring the contour of the p-polarized components 712 and 714. For example, the lens group 720 may be cylindrical, spherical, circular, rectangular, or have any other suitable shape. Furthermore, the lens group 720 may include any combination of lenses, singlet lens elements, prisms, and/or diffractive elements suitable for tailoring the contour of the p-polarized components 712 and 714.

In one embodiment, after receiving the p-polarized components 712 and 714, the lens group 720 may pass the p-polarized components 712 and 714 to the target plane 724. According to the illustrated embodiment, the p-polarized components 712 and 714 that pass through the lens group 720 are referred to as polarized rays 722.

Although the illustrated embodiment illustrates the imaging lens pair 718 and the lens group 720 as separate lenses, in one embodiment, the imaging lens pair 718 and the lens group 720 may be a part of the same lens group, or may even be the same lens. In such an embodiment, the lens group (or single lens) may pass the p-polarized components 712 and 714 to the target plane 724 as the polarized rays 722.

Target plane 724 may include any device that allows the polarized rays 722 to be viewed as an image. In one embodiment, the target plane 724 may include a collecting aperture for any incident beams, a diffusing screen, a blank wall, a user's eye, an optical diffuser, a mirror, a spatial modulator, an image generator, or any other suitable device for receiving the polarized rays 722 from the lens group 720. In one embodiment, the image may be an image of the illumination source in subsystems 702 and 704.

Although FIG. 7 illustrates the polarized rays 722 propagating directly to the target plane 724, in certain embodiments, the polarized rays 722 may first propagate to various illumination system elements before propagating to the target plane 724. For example, as is discussed in FIG. 4, the polarized rays 722 may propagate to a second polarizing beamsplitter similar to the second polarizing beamsplitter 426 of FIG. 4, a quarter-wave-plate similar to the quarter-wave-plate 428 of FIG. 4, and an image generator similar to the image generator 430 of FIG. 4, before propagating to the target plane 724. As another example, as is discussed in FIG. 5, the polarized rays 722 may propagate to a second polarizing beamsplitter similar to the second polarizing beamsplitter 526 of FIG. 5, a quarter-wave-plate similar to the quarter-wave-plate 528 of FIG. 5, an image generator similar to the image generator 530 of FIG. 5, a second quarter-wave-plate similar to the second quarter-wave-plate 532 of FIG. 5, and a mirror similar to the mirror 534 of FIG. 5, before propagating to the target plane 724.

As a further example, as is discussed in FIG. 6, the polarized rays 722 may propagate to a second polarizing beamsplitter similar to the second polarizing beamsplitter 626 of FIG. 6, a quarter-wave-plate similar to the quarter-wave plate 628 of FIG. 6, an image generator similar to the image generator 630 of FIG. 6, an imaging lens similar to the imaging lens 634 of FIG. 6, and a component similar to the component 638 of FIG. 6, before propagating to the target plane 724. In such an example, the illumination system 700 be a Head-Up Display (HUD) illumination system, or a Helmet-Mounted Display (HMD) illumination system. As a further example, the polarized rays 722 may propagate to a second polarizing beamsplitter similar to the second polarizing beamsplitter 526 of FIG. 5, a quarter-wave-plate similar to the quarter-wave-plate 528 of FIG. 5, an image generator similar to the image generator 530 of FIG. 5, a second quarter-wave-plate similar to the second quarter-wave-plate 532 of FIG. 5, and a mirror similar to the mirror 534 of FIG. 5, an imaging lens similar to the imaging lens 634 of FIG. 6, and a component similar to the component 638 of FIG. 6, before propagating to the target plane 724. In such an example, the illumination system 700 be a Head-Up Display (HUD) illumination system, or a Helmet-Mounted Display (HMD) illumination system.

According to one embodiment, by combining the rays emitted from subsystems 702 and 704, the illumination system 700 may create an image on the target plane 724 using both of the subsystems 702 and 704. In a further embodiment, despite the rays being combined, the polarized rays permit the illumination and a reflection from an object to be discerned from one another even if they propagate over the same path. Furthermore, the illuminated combination of like polarized optical fields may be polarization combined with similar orthogonal pairs. Such combination may in turn be recirculated to become like polarized, then combined with their orthogonal counterparts, in a cascaded fashion.

In a further embodiment, by combining the rays emitted from subsystems 702 and 704, the rays emitted from both subsystems 702 and 704 may be transmitted to the same image generator. This may allow the illumination system 700 to only include a single image generator, as opposed to typical systems that may require a separate image generator for each illumination source (or each subsystem).

Modifications, additions, or omissions may be made to the illumination system 700 without departing from the scope of the invention. For example, illumination system 700 may be modified so that the p-polarized components 712 are rotated to s-polarized components 712 instead of the s-polarized components 714 being rotated to p-polarized components 714. The components of the illumination system 700 may be integrated or separated. Moreover, the operations of the illumination system 700 may be performed by more, fewer, or other components. For example, the operations of the first polarizing beamsplitter 710 may be performed by more than one component.

Figure 8:
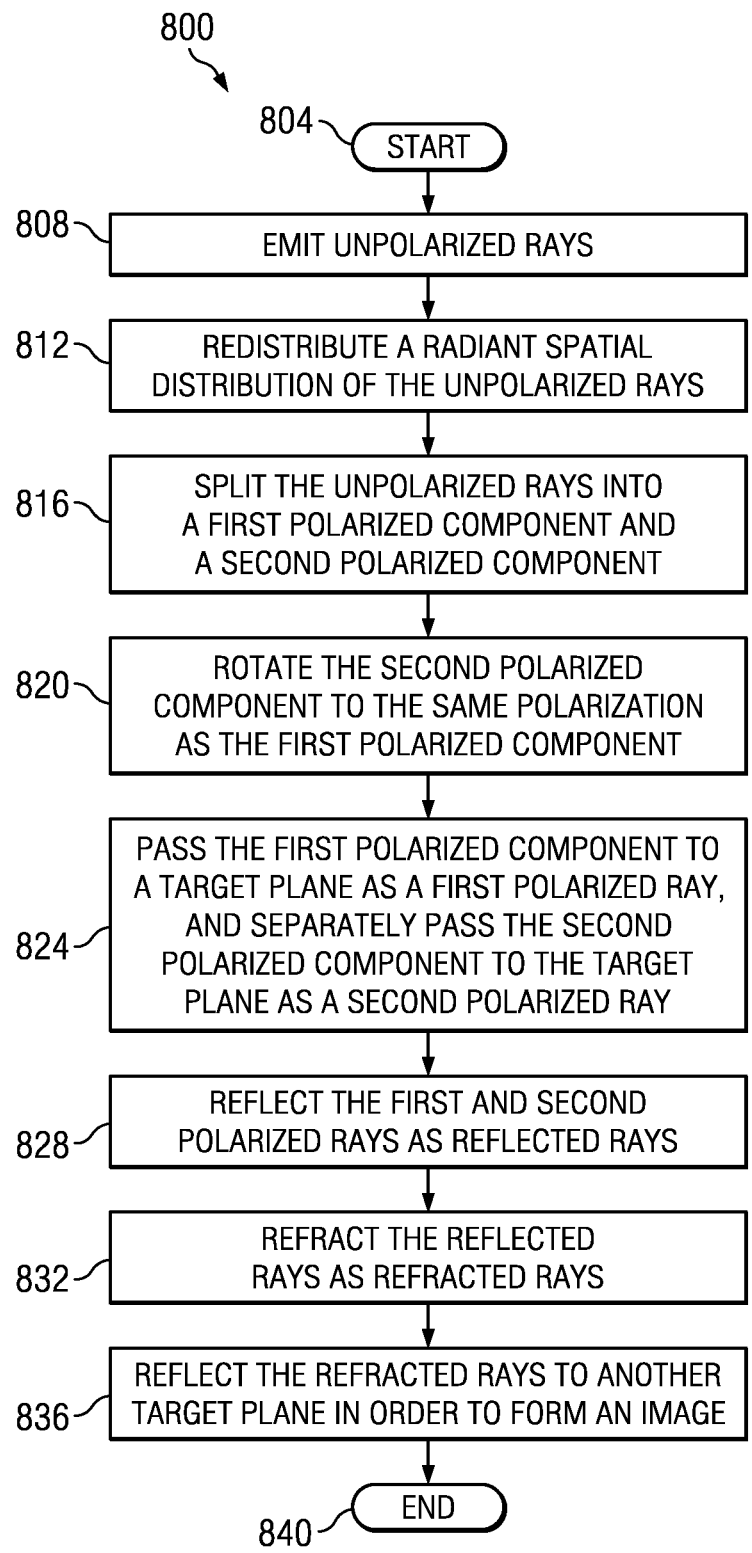
FIG. 8 is a flowchart illustrating an example method for efficiently delivering rays from a light source to create an image.

FIG. 8 is a flowchart illustrating an example method 800 for efficiently delivering rays from a light source to create an image. In one embodiment, the method 800 may be performed by an illumination system, such as illumination system 100 of FIG. 1, illumination system 200 of FIG. 2, illumination system 300 of FIG. 3, illumination system 400 of FIG. 4, illumination system 500 of FIG. 5, and/or illumination system 600 of FIG. 6. In one embodiment, the method 800 may be performed by a combination of illumination systems, such as a combination of illumination system 100 of FIG. 1, illumination system 200 of FIG. 2, illumination system 300 of FIG. 3, illumination system 400 of FIG. 4, illumination system 500 of FIG. 5, and/or illumination system 600 of FIG. 6. In further embodiments, the illumination system may be a HUD.

The method begins at step 804. At step 808, unpolarized rays are emitted. In certain embodiments, the unpolarized rays are emitted by an illumination source. In certain embodiments, the illumination source may include any device that emits electromagnetic radiation. In certain embodiments, the illumination source may emit electromagnetic radiation in the visible range. In certain embodiments, the illumination source may be a light emitting diode, an incandescent lamp, an electric discharge lamp, or a laser.

At step 812, a radiant spatial distribution of the unpolarized rays is redistributed. In certain embodiments, the radiant spatial distribution of the unpolarized rays may be redistributed by a beam homogenizer. In certain embodiments, the radiant spatial distribution of the unpolarized rays may be redistributed in a predetermined manner. In certain embodiments, the radiant spatial distribution of the unpolarized rays may be redistributed to a substantially homogenous radiant spatial distribution. In certain embodiments, the redistribution of the radiant spatial distribution of the unpolarized rays may be controllable and/or arbitrary.

Although the method 800 is illustrated as including the step 812 where the radiant spatial distribution of the unpolarized rays is redistributed, in certain embodiments, this step may be optional. For example, in certain embodiments, the radiant spatial distribution of the unpolarized rays may not be redistributed.

At step 816, the unpolarized rays are split into a first polarized component and a second polarized component. In certain embodiments, the unpolarized rays may be split into the first polarized component and the second polarized component by a polarizing beamsplitter. In certain embodiments, the first polarized component and the second polarized component may have different polarizations (such as orthogonal polarizations). For example, the first polarized component may be a p-polarized component, and the second polarized component may be an s-polarized component. As another example, the first polarized component may be an s-polarized component and the second polarized component may be a p-polarized component. In certain embodiments, by splitting the unpolarized rays into the first polarized component and the second polarized component, the unpolarized rays may be polarized.

At step 820, the second polarized component is rotated to the same polarization as the first polarized component. In certain embodiments, the second polarized component may be rotated to the same polarization as the first polarized component by a half-wave plate. In certain embodiments, the second polarized component may be rotated from a s-polarized component to a p-polarized component. In certain embodiments, the second polarized component may be rotated from a p-polarization to a s-polarized component. In certain embodiments, the rotation of the second polarized component to the same polarization as the first polarized component may be referred to as likewise polarization.

At step 824, the first polarized component is passed to a target plane as a first polarized ray, and the second polarized component is separately passed to the target plane as a second polarized ray. In certain embodiments, this step may be performed by a lens group. In certain embodiments, since the first polarized ray is passed to the target plane separately from the second polarized ray, both the first and second polarized rays are separately delivered to the target plane, resulting in a more efficient delivery of the rays. As such, an image may be created with two separate radiant spatial distributions in the orthogonal plane, and therefore, the two separate radiant spatial distributions may be used to arbitrarily redistribute the radiant spatial distribution (such as to form a single more uniform (or homogenous) radiant spatial distribution in the orthogonal plane). Therefore, the rays emitted from the illumination source may be more efficiently used to create the image.

In certain embodiments, prior to the first and second polarized rays reaching the target plane, a contour of the first and second polarized rays may be tailored to match a pattern of the target plane. In certain embodiments, the contour of the first and second polarized rays may be tailored by the lens group. In certain embodiments, by tailoring the contour of the first and second polarized rays to match the pattern of the target plane, the efficiency of the illumination system may be increased by preventing optical power from being used to improperly illuminate the target plane (e.g., such as occurs when the size of the illumination cross section is too big for the target plane, or is improperly shaped for the target plane).

In certain embodiments, the first and second polarized rays may pass through (or reflect from) one or more additional elements before reaching the target plane. For example, in certain embodiments, the first and second polarized rays may be converted from a linear polarization to a circular polarization prior to reaching the target plane. In certain embodiments, the conversion of the first and second polarized rays from a linear polarization to a circular polarization may be performed by a quarter-wave-plate.

At step 828, the first and second polarized rays are reflected as reflected rays. In certain embodiments, this step may be performed by a target plane, such as an image generator. In certain embodiments, the image generator may be a spatial modulator. In certain embodiments, the image generator may be a DMD, MEMS, and/or a reflective LCD. In certain embodiments, the reflected rays may remain substantially polarized after being reflected by the image generator.

In certain embodiments, reflected rays may pass through (or reflect from) one or more additional elements after being reflected by the image generator. For example, in certain embodiments, the reflected rays may be converted from a circular polarization to another linear polarization. In certain embodiments, the conversion of the reflected rays from the circular polarization to the other linear polarization may be performed by the quarter-wave-plate.

At step 832 the reflected rays are refracted as refracted rays. In certain embodiments, this step may be performed by an imaging lens. In certain embodiments, the imaging lens may include multiple lenses arranged as a lens group. In certain embodiments, the imaging lens may include any combination of lenses, singlet lens elements, prisms, and/or diffractive elements. In certain embodiments, the imaging lens may include a lens group. In certain embodiments, the refracted rays may be further altered in any other suitable manner. For example, the refracted rays may be magnified so that an image may be enlarged so as to be viewed by a user.

At step 836, the refracted rays are reflected to another target plane in order to form an image. In certain embodiments, this step may be performed by a component. In certain embodiments, the refracted rays reflected by the component may be combined with one or more outer scenery images. As such, an overlapping image may be formed. In certain embodiments, the overlapping image may include a combination of the generated image (e.g., from the refracted rays reflected towards the target plane) and the outer scenery.

In certain embodiments, the component may include a preferential polarization spectral coating for reflecting the refracted rays having a particular polarization. For example, the component may include a p-polarization preferential polarization spectral coating. As such, the component may preferentially reflect the refracted rays having a p-polarization.

At step 840, the method 800 ends. The steps illustrated in FIG. 8 may be combined, modified, or deleted where appropriate. For example, steps 812 and 828-836 of method 800 may be optional. Additional steps may also be added to the example operation. Furthermore, the described steps may be performed in any suitable order. Additionally one or more of the steps may be performed at substantially the same time (or even the same time) as other steps illustrated.

Figure 9:
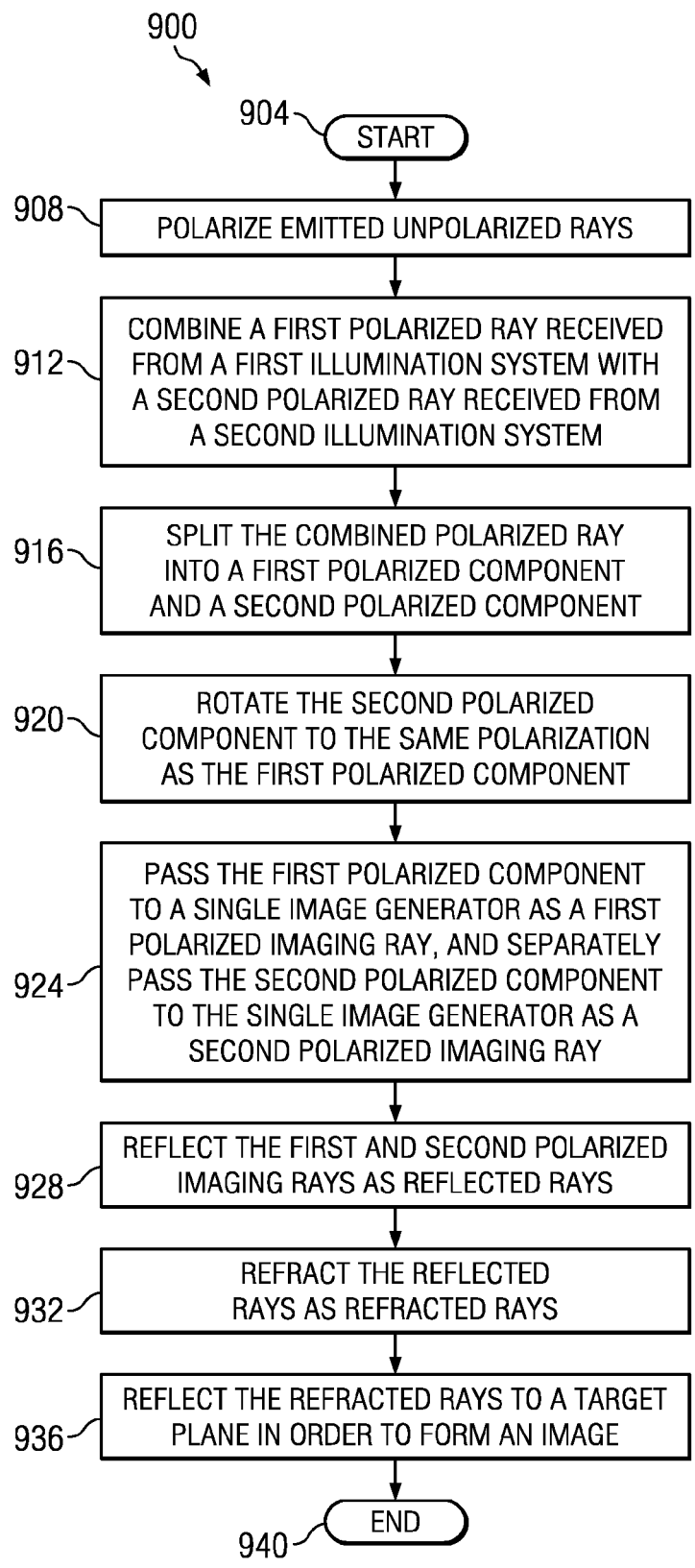
FIG. 9 is a flowchart illustrating an example method for combining rays emitted from two unpolarized illumination sources in order to create an image.

FIG. 9 is a flowchart illustrating an example method 900 for combining rays emitted from two unpolarized illumination sources in order to create an image. In one embodiment, the method 900 may be performed by an illumination system, such as illumination system 700 of FIG. 7. In certain embodiments, the method 900 may be performed by a combination of illumination systems, such as a combination of illumination system 700 of FIG. 7, and illumination system 100 of FIG. 1, illumination system 200 of FIG. 2, illumination system 300 of FIG. 3, illumination system 400 of FIG. 4, illumination system 500 of FIG. 5, and/or illumination system 600 of FIG. 6. In further embodiments, the illumination system may be a HUD.

The method begins at step 904. At step 908, emitted unpolarized rays are polarized. In certain embodiments, the emitted unpolarized rays may be polarized in any suitable manner and by any suitable element(s). In certain embodiments, the step 908 of the method 900 of FIG. 9 may be similar to steps 808-820 of the method 800 of FIG. 8. In certain embodiments, the step 908 of the method 900 of FIG. 9 may include steps 808-820 of FIG. 9 for each of a first illumination system and a second illumination system. For example, in certain embodiments, at both the first illumination system and the second illumination system, unpolarized rays may be emitted, the radiance spatial distribution of the unpolarized rays may be redistributed, the unpolarized rays may be split into a first polarized illumination system component and a second polarized illumination system component, and the second polarized illumination system component may be rotated to the same polarization as the first polarized illumination system component. In certain embodiments, the step 908 of the method 900 of FIG. 9 may further include additional steps. For example, in certain embodiments, at both the first illumination system and the second illumination system, the first polarized illumination system component may be passed to a polarizing beamsplitter as a first polarized illumination system ray and the second polarized illumination system component may be separately passed to the polarizing beamsplitter as a second polarized illumination system ray. In certain embodiments, at least one of the first and second polarized illumination system rays of the first illumination system may be a first polarized ray, and at least one of the first and second polarized illumination system rays of the second illumination system may be a second polarized ray.

At step 912, a first polarized ray received from a first illumination system may be combined with a second polarized ray received from a second illumination system. In certain embodiments, the first polarized ray may be combined with the second polarized ray by a polarizing beamsplitter. In certain embodiments, the combination of the first polarized ray with the second polarized ray may form a combined ray. In certain embodiments, the first polarized ray may have a wavelength for a first color and the second polarized ray may have a wavelength for a second color. As such, the first polarized ray may be the color blue, while the second polarized ray may be the color red. In certain embodiments, by combining the first polarized ray and the second polarized ray, an illumination system may create an image that includes both the colors blue and red.

Although step 912 is illustrated as combining the first polarized ray with the second polarized ray, in certain embodiments, the step may include combining a third polarized ray received from a third illumination system with the first polarized ray and the second polarized ray in order to form the combined ray. Furthermore, in certain embodiments, the combination illustrated in step 912 may include any suitable number of polarized rays being combined. For example, the step may combine more than three polarized rays, with each of the more than three polarized rays having been received from a different illumination system. As such, polarized rays received from any number of illumination systems may be combined into the combined polarized ray.

At step 916, the combined polarized ray is split into a first polarized component and a second polarized component. In certain embodiments, the combined polarized ray is split into the first polarized component and the second polarized component by a second beamsplitter. In certain embodiments, the first polarized component may have a different polarization than the second polarized component. For example, the first polarized component may be a p-polarized component, and the second polarized component may be an s-polarized component. As another example, the first polarized component may be an s-polarized component and the second polarized component may be a p-polarized component.

At step 920, the second polarized component is rotated to the same polarization as the first polarized component. In certain embodiments, the second polarized component may be rotated to the same polarization as the first polarized component by a half-wave plate. In certain embodiments, the second polarized component may be rotated from a s-polarized component to a p-polarized component. In certain embodiments, the second polarized component may be rotated from a p-polarization to a s-polarized component. In certain embodiments, the rotation of the second polarized component to the same polarization as the first polarized component may be referred to as likewise polarization.

At step 924, the first polarized component is passed to a single image generator as a first polarized imaging ray and the second polarized component is separately passed to the single image generator as a second polarized imaging ray. In certain embodiments, this step may be performed by a lens group. In certain embodiments, since the first polarized imaging ray is passed to the single image generator separately from the second polarized imaging ray, both the first and second polarized imaging rays are separately delivered to the single image generator, resulting in a more efficient delivery of the rays. As such, an image may be created with two separate radiant spatial distributions in the orthogonal plane, and therefore, the two separate radiant spatial distributions may be used to arbitrarily redistribute the radiant spatial distribution (such as to form a single more uniform (or homogenous) radiant spatial distribution in the orthogonal plane). Therefore, the rays emitted from the illumination source may be more efficiently used to create the image.

In certain embodiments, prior to the first and second polarized imaging rays reaching the single image generator, a contour of the first and second polarized imaging rays may be tailored to match a pattern of the image generator. In certain embodiments, the contour of the first and second polarized imaging rays may be tailored by the lens group. In certain embodiments, by tailoring the contour of the first and second polarized rays to match the pattern of the image generator, the efficiency of the illumination system may be increased by preventing optical power from being used to improperly illuminate the image generator (e.g., such as occurs when the size of the illumination cross section is too big for the image generator, or is improperly shaped for the image generator).

In certain embodiments, the first and second polarized imaging rays may pass through (or reflect from) one or more additional elements before reaching the image generator. For example, in certain embodiments, the first and second polarized imaging rays may be converted from a linear polarization to a circular polarization prior to reaching the image generator. In certain embodiments, the conversion of the first and second polarized imaging rays from a linear polarization to a circular polarization may be performed by a quarter-wave-plate.

Figure 10:
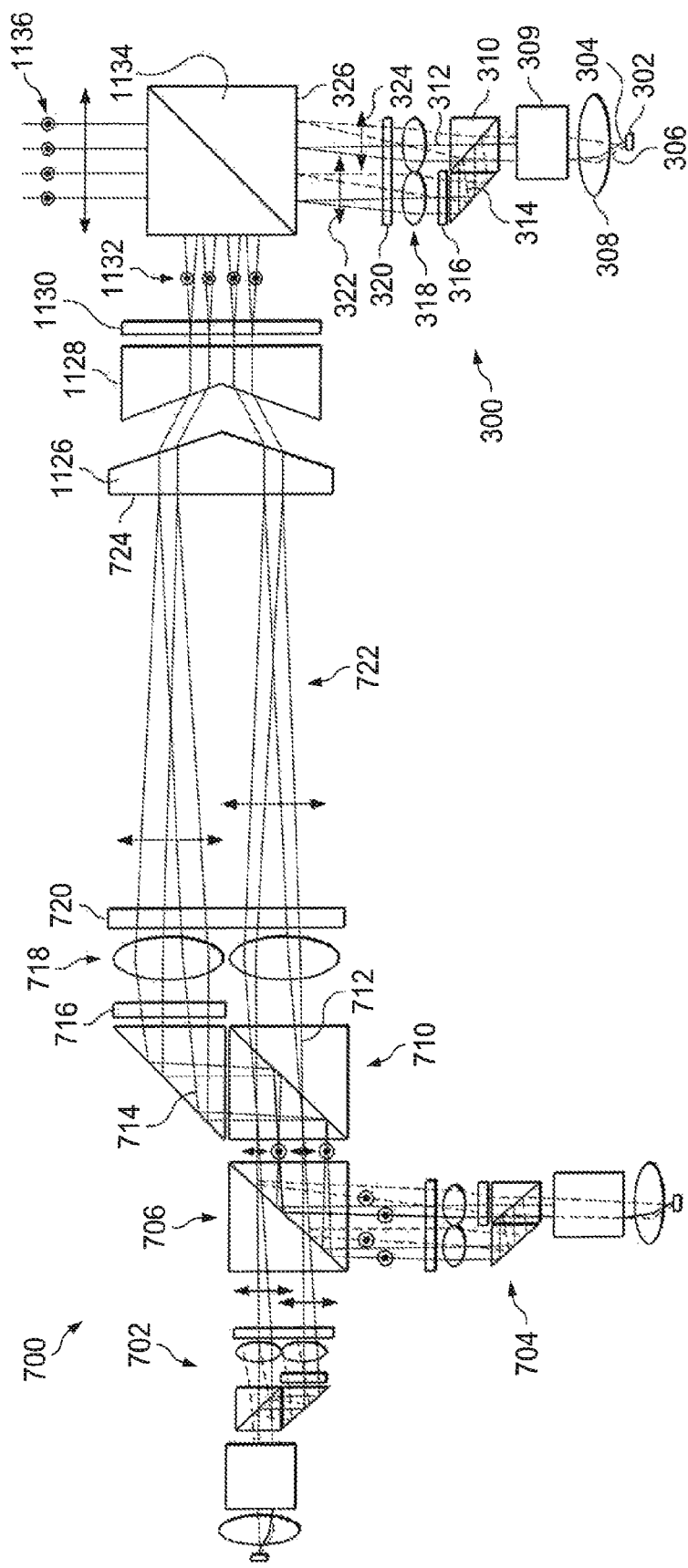
FIG. 10 is a schematic illustrating a cascaded arrangement of illumination systems in accordance with various embodiments.

In certain embodiments, although step 924 of the method 900 illustrates the first and second polarized imaging rays being passed to the single image generator, in certain embodiments, the first and second polarized imaging rays may be alternatively passed to another polarizing beamsplitter. In such embodiments, the additional polarizing beamsplitter may combine one or more of the first and second polarized imaging rays from the illumination system with additional polarized rays received from additional illumination systems. As such, steps 912-920 of method 900 may be repeated using these additional polarized rays. Furthermore, steps 912-920 of method 900 may be repeated any suitable number of times. Accordingly, there may be a cascading effect that allows any suitable number of polarized rays received from any suitable number of illumination systems to be combined any suitable number of times prior to finally being passed to the single image generator at step 924. For example, as shown in FIG. 10, various illumination systems 300, similar to that shown in FIG. 3, can be combined with other illumination devices such as an illumination system 700, similar to that shown in FIG. 7. As explained above, rays that are emitted from an unpolarized illumination source are polarized and their rotation is rotated to a like polarization and combined side by side. In FIG. 10, a cascaded combination of multiple illumination systems is demonstrated. The illumination systems may be of different power or dimension. The illumination system 700 has two sets of rays 724 that are brought to a greater proximity to one another by the use of a positive axicon 1126 and a negative axicon 1128. In one embodiment, the transmitted beams 1132 that are rotated to become s-polarized by a retarder 1130 are brought to a similar proximity to the beams 322 and 324 of the illumination system 300. Then, the beams 1132 are combined with the beams 322 and 324 in a polarizer cube 1134, emerging as the unpolarized beam set 1136. The process of further polarization may be repeated as in FIG. 3, and further combination with illumination systems of various dimensions and various power levels may be repeated in a like fashion. In this way, any suitable number of illumination systems may be combined prior to creating an image on a target plane.

At step 928, the first and second polarized imaging rays are reflected as reflected rays. In certain embodiments, this step may be performed by an image generator. In certain embodiments, the image generator may be a spatial modulator. In certain embodiments, the image generator may be a DMD, MEMS, and/or a reflective LCD. In certain embodiments, the reflected rays may remain substantially polarized after being reflected by the image generator.

In certain embodiments, the reflected rays may pass through (or reflect from) one or more additional elements after being reflected by the image generator. For example, in certain embodiments, the reflected rays may be converted from a circular polarization to another linear polarization. In certain embodiments, the conversion of the reflected rays from the circular polarization to the linear polarization may be performed by the quarter-wave-plate.

At step 932 the reflected rays are refracted as refracted rays. In certain embodiments, this step may be performed by an imaging lens. In certain embodiments, the imaging lens may include multiple lenses arranged as a lens group. In certain embodiments, the imaging lens may include any combination of lenses, singlet lens elements, prisms, and/or diffractive elements. In certain embodiments, the imaging lens may include a lens group. In certain embodiments, the refracted rays may be altered in any other suitable manner. For example, the refracted rays may be magnified so that an image may be enlarged so as to be viewed by a user.

At step 936, the refracted rays are reflected to a target plane in order to form an image. In certain embodiments, this step may be performed by a component. In certain embodiments, the refracted rays reflected by the component may be combined with one or more outer scenery images. As such, an overlapping image may be formed. In certain embodiments, the overlapping image may include a combination of the generated image (e.g., from the refracted rays reflected towards the target plane) and the outer scenery.

In certain embodiments, the component may include a preferential polarization spectral coating for reflecting the refracted rays having a particular polarization. For example, the component may include a p-polarization preferential polarization spectral coating. As such, the component may preferentially reflect the first and second refracted rays having a p-polarization.

At step 940, the method 900 ends. The steps illustrated in FIG. 9 may be combined, modified, or deleted where appropriate. Additional steps may also be added to the example operation. Furthermore, the described steps may be performed in any suitable order. Additionally one or more of the steps may be performed at substantially the same time (or even the same time) as other steps illustrated.

In accordance with particular embodiments, the present disclosure may include an illumination system that polarizes light emitted from unpolarized illumination source. Typical illumination systems are predominately unpolarized, yet polarized light provides many possibilities such as illumination discrimination and beam combination.

In accordance with particular embodiments, the present disclosure may include an illumination system that homogenizes light emitted from unpolarized illumination source. Typical illumination systems are inhomogeneous, yet homogeneity across the optical field is desirable for well balanced imaging. Importantly, in one embodiment, polarization of the illuminator enables the combination of illumination sources with radiant spectra. Furthermore, although state-of-the-art recirculators may polarize unpolarized light, they are deficient in efficiently delivering homogenous illumination to a target plane.

In accordance with particular embodiments, the present disclosure may include an illumination system that tailors the contour of the rays delivered to a target plane. In certain embodiments, by tailoring the contour of the first and second polarized rays to match the pattern of the image generator, the efficiency of the illumination system may be increased by preventing optical power from being used to improperly illuminate the image generator (e.g., such as occurs when the size of the illumination cross section is too big for the image generator, or is improperly shaped for the image generator).

In accordance with particular embodiments, the present disclosure may include a method to efficiently deliver electromagnetic radiation from an emitter to a target plane. In one embodiment, efficiency may be defined as the ratio of the illumination received at the target plane to the emitted illumination. The radiation emitted from a unpolarized source is polarized to a high degree. Further, emitted illumination that may have a nonuniform spatial distribution is redistributed to assume a controllable arbitrary profile, one of which may be a nearly uniform distribution. Then, a plurality of emitters may be combined owing to mutually orthogonal polarization of cascaded emitter pairs. Based on this, emitters having different yet partially overlapping colors of an RGB triangle are combined to create a color image using a single image generator.

In accordance with particular embodiments, the present disclosure may include an illumination system that combines the rays emitted from two different illumination sources. This may allow the illumination system to only include a single image generator, as opposed to typical systems that may require a separate image generator for each illumination source.

In accordance with particular embodiments, the present disclosure may include an illumination system utilizing an unpolarized illumination source. In one embodiment, the illumination is made polarized. In a further embodiment, the illumination is transmitted onto a spatial modulator in a manner as to accurately illuminate said spatial modulator. In another embodiment, the predominant illuminant radiation is conveyed to said spatial modulator, wherein said spatial modulator reflects said illumination which remains predominantly polarized.

In one embodiment, the illumination source is an LED. In another embodiment, the illumination source is an incandescent lamp. In a further embodiment, the illumination source is an electric discharge lamp. In an additional embodiment, the illumination source is a laser.

In one embodiment, the illumination system further includes a radiance profile converter, known in the art as a beam homogenizer, that converts the spatial distribution of the illumination emanating from said illumination source to another arbitrarily controllable distribution. In a further embodiment, said radiance profile converter converts said radiance profile to a predominantly homogeneous optical field.

According to additional embodiments, said homogenized optical beam is transmitted onto a spatial modulator in a manner as to accurately illuminate said spatial modulator. In a further embodiment, said illumination illuminates predominantly homogeneously said spatial modulator. In another embodiment, said spatial modulator predominantly reflects nearly all said incident illumination without depolarization.

In accordance with particular embodiments, the present disclosure may include an illumination system utilizing an unpolarized illumination source. In one embodiment, the illumination is made polarized. In a further embodiment, the illumination profile is converted to a predominantly homogeneous profile. In another embodiment, the illumination is transmitted onto a spatial modulator via a polarizing beamsplitter in a manner as to split nearly all the incident radiation and in a manner as to accurately illuminate said spatial modulator. In a further embodiment, the predominant illuminant radiation is conveyed to said spatial modulator. In a further embodiment, said spatial modulator reflects said illumination which remains predominantly polarized.

According to one embodiment, a quarter-wave-plate is disposed between said polarizing beamsplitter and said spatial modulator in order to convert a linearly polarized optical beam to a circularly polarized beam. In another embodiment, the reflected beam from said spatial modulator is circularly polarized in an opposite sense to the linearly polarized optical beam, whereupon passing through said quarter-wave-plate, the reflected beam is further converted to a linearly and orthogonally polarized beam relative to said linearly polarized optical beam, and whereupon nearly all said radiation contained in said beam is transmitted through said polarizing beamsplitter.

In accordance with particular embodiments, the present disclosure may include an illumination system utilizing an unpolarized illumination source. In one embodiment, the illumination is made polarized. In a further embodiment, the illumination profile is converted to a predominantly homogeneous profile. In an additional embodiment, the illumination is transmitted onto a spatial modulator via a polarizing beamsplitter in a manner as to split nearly all the incident radiation and in a manner as to accurately illuminate said spatial modulator. In a further embodiment, the predominant illuminant radiation is conveyed to said spatial modulator. In another embodiment, said spatial modulator reflects said illumination which remains predominantly polarized. In an additional embodiment, the polarization of said illumination is handled such that nearly all the reflected illumination is transmitted through said polarizing beamsplitter and where a lens is disposed in the path of said radiation constituting a first part of an imaging system. In another embodiment, a partially reflecting mirror constituting a second part of said imaging system is disposed past said lens so as to image said spatial modulator on a target.

In one embodiment, said lens comprises a plurality of singlet lens elements. In a further embodiment, said lens comprises a plurality of singlet lens elements and prisms. In an additional embodiment, said lens comprises a plurality of singlet lens elements and prisms and diffractive elements. In a particular embodiment, said partially reflective mirror reflects a fraction of said illumination due to spectral coating of its inward looking surface. In a further embodiment, said partially reflective mirror transmits a fraction of the outer illumination to the system due to spectral coating of its inward looking surface and broadband antireflective coating of its outward looking surface. In additional embodiments, said partially reflective mirror reflects a fraction of said illumination due to polarization preference of its inward looking surface. In other embodiments, said partially reflective mirror transmits a fraction of the outer illumination to the system due to polarization preference of its inward looking surface and broadband antireflective coating of its outward looking surface.

In another embodiment, said partially reflective mirror serves as an eyepiece. In another embodiment, said partially reflective mirror transmits a fraction of the outer illumination to the system aligned with the imaging illumination such as to form an overlapping image of the outer scenery and the generated image on the target.

In accordance with particular embodiments, the present disclosure may include an illumination system combining unpolarized illumination sources. In one embodiment, said illumination sources emanate similar spectral radiation. In another embodiment, the illumination profile is converted to a predominantly homogeneous profile. In a further embodiment, the predominant illuminant radiation is conveyed onto a designated area. In another embodiment, said designated area contains said illumination which remains predominantly polarized. According to one embodiment, said combination of unpolarized illumination sources with predominantly similar spectra are further combined in a multisource cascade.

Although the embodiments in the disclosure have been described in detail, numerous changes, substitutions, variations, alterations, and modifications may be ascertained by those skilled in the art. It is intended that the present disclosure encompass all such changes, substitutions, variations, alterations, and modifications.

What is claimed is:

1. A system, comprising:
    a polarizing beamsplitter to combine a first polarized ray received from a first illumination system with a second polarized ray received from a second illumination system to form a combined polarized ray;
    a second polarizing beamsplitter to split the combined polarized ray into a first polarized component and a second polarized component, the first polarized component and the second polarized component having orthogonal polarizations to each other;
    a half-wave plate to rotate the second polarized component to the same polarization as the first polarized component; and
    a lens group to pass the first polarized component to a single image generator as a first polarized ray, and further to separately pass the second polarized component to the single image generator as a second polarized ray;
    wherein both the first and second illumination systems comprise:
        an illumination source to emit a first unpolarized ray;
        a beam homogenizer to redistribute an illumination spatial distribution of the one or more unpolarized rays to a plurality of different spatial distribution profiles;
        an illumination system polarizing beamsplitter to split the first unpolarized ray into a first polarized illumination system component and a second polarized illumination system component, the first polarized illumination system component and the second polarized illumination system component having orthogonal polarizations to each other;
        an illumination system half-wave plate to rotate the second polarized illumination system component to the same polarization as the first polarized illumination system component; and
        an illumination system lens group to pass the first polarized illumination system component to the polarizing beam splitter as a first polarized illumination system ray, and further to separately pass the second polarized illumination system component to the polarizing beamsplitter as a second polarized illumination system ray; and
    wherein the first polarized ray received at the polarizing beamsplitter from the first illumination system comprises at least one of the first and second polarized illumination system rays of the first illumination system, and wherein the second polarized ray received at the polarizing beamsplitter from the second illumination system comprises at least one of the first and second polarized illumination system rays of the second illumination system.

2. The system of claim 1, wherein the beam homogenizer converts the illumination spatial distribution of the one or more unpolarized rays to a substantially homogenous spatial distribution.

3. The system of claim 1, wherein the beam homogenizer converts the illumination spatial distribution of the one or more unpolarized rays to a profile selected from the group consisting of: a saddle function distribution, a substantially flat-top distribution, a super-Gaussian distribution, a flattened Gaussian distribution, a super Lorentzian distribution, a Fermi-Dirac profile distribution, and a step function distribution.

4. The system of claim 3 wherein the beam homogenizer first converts the illumination spatial distribution of the one or more unpolarized rays to a profile selected from the group and then converts the illumination spatial distribution of the one or more unpolarized rays to a different profile selected from the group.

5. The system of claim 1, wherein the lens group tailors a contour of the first and second polarized rays to match a pattern of a target plane.

6. The system of claim 1, wherein the single image generator reflects the first and second polarized rays as reflected rays, wherein the reflected rays remain substantially polarized, and wherein the system further comprises:
    an imaging lens to refract the reflected rays as refracted rays; and
    a component to reflect the refracted rays to a target in order to form an image.

7. The system of claim 6, wherein the component further transmits illumination from outer scenery to the target so as to form an overlapping image that includes the image and the outer scenery.

8. The system of claim 6, wherein the component includes a preferential polarization reflection to reflect the refracted rays having a particular polarization.

9. The system of claim 6, wherein the component includes a preferential spectral coating to reflect the refracted rays having a particular chromatic content.

10. The system of claim 6, further comprising a quarter-wave-plate to convert the first and second polarized rays from a primary linear polarization to a circular polarization, and further to convert the reflected rays from the circular polarization to a secondary linear polarization orthogonal to the primary linear polarization.

11. The system of claim 1, wherein the system comprises a Head-Up Display (HUD) projection system.

12. The system of claim 1, wherein the lens group further reshapes a beam cross section of the first and second polarized rays.

13. A system, comprising:
    a polarizing beamsplitter to combine a first polarized ray received from a first illumination system with a second polarized ray received from a second illumination system and further with a third polarized ray received from a third illumination system to form a combined polarized ray;
    a second polarizing beamsplitter to split the combined polarized ray into a first polarized component and a second polarized component, the first polarized component and the second polarized component having orthogonal polarizations to each other;
    a half-wave plate to rotate the second polarized component to the same polarization as the first polarized component; and
    a lens group to pass the first polarized component to a single image generator as a first polarized imaging ray, and further to separately pass the second polarized component to the single image generator as a second polarized imaging ray;
    wherein both the first and second illumination systems comprise:
        an illumination source to emit a first unpolarized ray; and
        a beam homogenizer to redistribute an illumination spatial distribution of the one or more unpolarized rays to a plurality of different spatial distribution profiles.

14. The system of claim 13, wherein the lens group further tailors a contour of the first and second polarized imaging rays to match a pattern of the single image generator.

15. The system of claim 13, wherein the single image generator is operable to reflect the first and second polarized imaging rays as reflected rays, wherein the reflected rays remain substantially polarized and further comprising:
- an imaging lens to refract the reflected rays as refracted rays; and
- a component to reflect the refracted rays to a target in order to form an image.

16. The system of claim 15, wherein the component further transmits illumination from outer scenery to the target so as to form an overlapping image that includes the image and the outer scenery.

17. The system of claim 13, wherein both the first and second illumination systems comprise:
- an illumination system polarizing beamsplitter to split the first unpolarized ray into a first polarized illumination system component and a second polarized illumination system component, the first polarized illumination system component and the second polarized illumination system component having orthogonal polarizations to each other;
- an illumination system half-wave plate to rotate the second polarized illumination system component to the same polarization as the first polarized illumination system component; and
- an illumination system lens group to pass the first polarized illumination system component to the polarizing beam splitter as a first polarized illumination system ray, and further to separately pass the second polarized illumination system component to the polarizing beamsplitter as a second polarized illumination system ray; and
- wherein the first polarized ray received at the polarizing beamsplitter from the first illumination system comprises at least one of the first and second polarized illumination system rays of the first illumination system, and wherein the second polarized ray received at the polarizing beamsplitter from the second illumination system comprises at least one of the first and second polarized illumination system rays of the second illumination system.

18. The system of claim 17, wherein the polarizing beamsplitter further combines a fourth polarized ray received from a fourth illumination system with the first, second, and third polarized rays to form the combined polarized ray.

19. The system of claim 13, wherein the polarizing beamsplitter further cascades a combination of polarized rays to form the combined polarized ray.

20. The system of claim 13, wherein the first polarized ray has a wavelength for a first color; and wherein the second polarized ray has a wavelength for a second color.

21. A method, comprising:
- combining a first polarized ray received from a first illumination system with a second polarized ray received from a second illumination system to form a combined polarized ray;
- splitting the combined polarized ray into a first polarized component and a second polarized component, the first polarized component and the second polarized component having orthogonal polarizations to each other;
- rotating the second polarized component to the same polarization as the first polarized component;
- passing the first polarized component to a single image generator as a first polarized ray, and separately passing the second polarized component to the single image generator as a second polarized ray; and
- at both of the first and second illumination systems:
  - emitting a first unpolarized ray;
  - redistributing an illumination spatial distribution of the one or more unpolarized rays to a plurality of different spatial distribution profiles;
  - splitting the first unpolarized ray into a first polarized illumination system component and a second polarized illumination system component, the first polarized illumination system component and the second polarized illumination system component having orthogonal polarizations to each other;
  - rotating the second polarized illumination system component to the same polarization as the first polarized illumination system component; and
  - passing the first polarized illumination system component to the polarizing beamsplitter as a first polarized illumination system ray, and separately passing the second polarized illumination system component to the polarizing beamsplitter as a second polarized illumination system ray; and
- wherein the first polarized ray received at the polarizing beamsplitter from the first illumination system comprises at least one of the first and second polarized illumination system rays of the first illumination system, and wherein the second polarized ray received at the polarizing beamsplitter from the second illumination system comprises at least one of the first and second polarized illumination system rays of the second illumination system.

22. The method of claim 21, wherein redistributing the illumination spatial distribution of the one or more unpolarized rays comprises converting the illumination spatial distribution of the one or more unpolarized rays to a substantially homogenous spatial distribution.

23. The method of claim 21, further comprising tailoring a contour of the first and second polarized rays to match a pattern of a target plane.

24. The method of claim 21, further comprising:
- reflecting, at the single image generator, the first and second polarized rays as reflected rays, wherein the reflected rays remain substantially polarized;
- refracting the reflected rays as refracted rays; and
- reflecting, at a component, the refracted rays to a target in order to form an image.

25. The method of claim 24, further comprising transmitting, at the component, illumination from outer scenery to the target so as to form an overlapping image that includes the image and the outer scenery.

26. The method of claim 24, further comprising converting the first and second polarized rays from a primary linear polarization to a circular polarization, and further converting the reflected rays from the circular polarization to a secondary linear polarization orthogonal to the primary linear polarization.

27. A method, comprising:
- combining a first polarized ray received from a first illumination system with a second polarized ray received from a second illumination system and further with a third polarized ray received from a third illumination system to form a combined polarized ray;
- splitting the combined polarized ray into a first polarized component and a second polarized component, the first polarized component and the second polarized component having orthogonal polarizations to each other;
- rotating the second polarized component to the same polarization as the first polarized component; and
- passing the first polarized component to a single image generator as a first polarized imaging ray, and separately passing the second polarized component to the single image generator as a second polarized imaging ray; and at both of the first and second illumination systems:
emitting a first unpolarized ray; and
redistributing an illumination spatial distribution of the one or more unpolarized rays to a plurality of different spatial distribution profiles.

28. The method of claim 27, further comprising tailoring a contour of the first and second polarized imaging rays to match a pattern of the image generator.

29. The method of claim 27, further comprising:
reflecting, at the single image generator, the first and second polarized imaging rays as reflected rays, wherein the reflected rays remain substantially polarized;
refracting the reflected rays as refracted rays; and
reflecting, at a component, the refracted rays to a target in order to form an image.

30. The method of claim 29, further comprising, transmitting, at the component, illumination from outer scenery to the target so as to form an overlapping image that includes the image and the outer scenery.

31. The method of claim 27, further comprising:
at both of first and second illumination systems:
splitting the first unpolarized ray into a first polarized illumination system component and a second polarized illumination system component, the first polarized illumination system component and the second polarized illumination system component having orthogonal polarizations to each other;
rotating the second polarized illumination system component to the same polarization as the first polarized illumination system component; and
passing the first polarized illumination system component to the polarizing beamsplitter as a first polarized illumination system ray, and separately passing the second polarized illumination system component to the polarizing beamsplitter as a second polarized illumination system ray; and
wherein the first polarized ray received at the polarizing beamsplitter from the first illumination system comprises at least one of the first and second polarized illumination system rays of the first illumination system, and wherein the second polarized ray received at the polarizing beamsplitter from the second illumination system comprises at least one of the first and second polarized illumination system rays of the second illumination system.

32. The method of claim 27, wherein the first polarized ray has a wavelength for a first color; and wherein the second polarized ray has a wavelength for a second color.

* * * * *